(12) United States Patent
Allen et al.

(10) Patent No.: US 8,693,943 B2
(45) Date of Patent: Apr. 8, 2014

(54) INTERNET BASED LEARNING SYSTEMS

(71) Applicant: Realtime Learning Systems, LLC, Salt Lake City, UT (US)

(72) Inventors: Rex J. Allen, Midway, UT (US); Jared M. Carman, Highland, UT (US)

(73) Assignee: Realtime Learning Systems, LLC, Salt Lake City, UT (US)

( * ) Notice: Subject to any disclaimer, the term of this patent is extended or adjusted under 35 U.S.C. 154(b) by 0 days.

(21) Appl. No.: 13/715,031

(22) Filed: Dec. 14, 2012

(65) Prior Publication Data

US 2013/0337429 A1  Dec. 19, 2013

Related U.S. Application Data

(63) Continuation of application No. 11/967,085, filed on Dec. 29, 2007, now Pat. No. 8,358,965.

(60) Provisional application No. 60/882,927, filed on Dec. 30, 2006.

(51) Int. Cl.
G09B 7/00  (2006.01)

(52) U.S. Cl.
USPC .......................................................... 434/362

(58) Field of Classification Search
USPC .......... 434/118, 322, 323, 350, 362, 365, 236
See application file for complete search history.

(56) References Cited

U.S. PATENT DOCUMENTS

| | | | | |
|---|---|---|---|---|
| 6,925,601 B2* | 8/2005 | Moore et al. | ................... | 715/707 |
| 6,978,115 B2* | 12/2005 | Whitehurst et al. | .......... | 434/350 |
| 7,003,576 B2* | 2/2006 | Bjornestad et al. | ........... | 709/229 |
| 7,014,467 B2* | 3/2006 | Krebs et al. | ................... | 434/118 |
| 7,029,280 B2* | 4/2006 | Krebs et al. | ................... | 434/118 |
| 7,258,557 B2* | 8/2007 | Matsubara et al. | ........... | 439/157 |
| 7,260,355 B2* | 8/2007 | L'Allier et al. | ............... | 434/362 |
| 7,272,615 B2* | 9/2007 | Li et al. | ......................... | 707/781 |
| 7,383,283 B2* | 6/2008 | Carrabis | ....................... | 434/238 |
| 2003/0152904 A1* | 8/2003 | Doty, Jr. | ........................ | 434/350 |
| 2006/0263756 A1* | 11/2006 | Berger et al. | ................. | 434/323 |
| 2009/0012789 A1* | 1/2009 | Gaudet et al. | ................. | 704/251 |

* cited by examiner

*Primary Examiner* — Kesha Frisby
(74) *Attorney, Agent, or Firm* — Snell & Wilmer L.L.P.

(57) ABSTRACT

A learning system is adapted to provide a learning management system adapted to present an exercise environment to the user in which the user is able to practice skills through a combination of presented media and practice areas. The learning system is adapted to provide feedback to the user during the practice session to allow the user to improve performance while in the exercise environment. Additionally, the learning system is adapted to track the user's performance in terms of practice time and in terms of accuracy percentage to allow the student and the educator to monitor performance related to effort. Still additionally, the learning systems of the present disclosure may be adapted to track the types of errors committed by the users to enable the users and educators to provide more directed educational experiences and practice sessions to overcome recurring problems.

19 Claims, 25 Drawing Sheets

FIG. 8 http://ncra.learnrealtime.com – 160-180 WPM: Literary: You're Processing: You're Not Struck (160 – Microsoft In...

Realtime Coach

SAVE PROGRESS

Literary: You're Processing; You're Not Struck (160 wpm, 05:47, 1 voice)

Set-Up | Exercise

Home

Description

Setting
An inspiring conversation between a court reporting student and an instructor.

Modes
Video, Audio, Text

Purposes
Advanced speedbuilding

Related Activities
None

Realtime Tip
Q. What were you expecting from your marriage that never occurred? A. Well, somebody to help shoulder the burden of being

Set-up

Assignment of Voices
Voice    Name
Q:
A:
Colloquy 1
Colloquy 2
Court
Return to Q&A
Colloquy 2

Words
Personal Dictionary            Job Dictionary email                          Janet Tilley
hesitations                    Janet
semester                       Chattanooga State's
heartfelt                      Realtime Program

FIG. 9

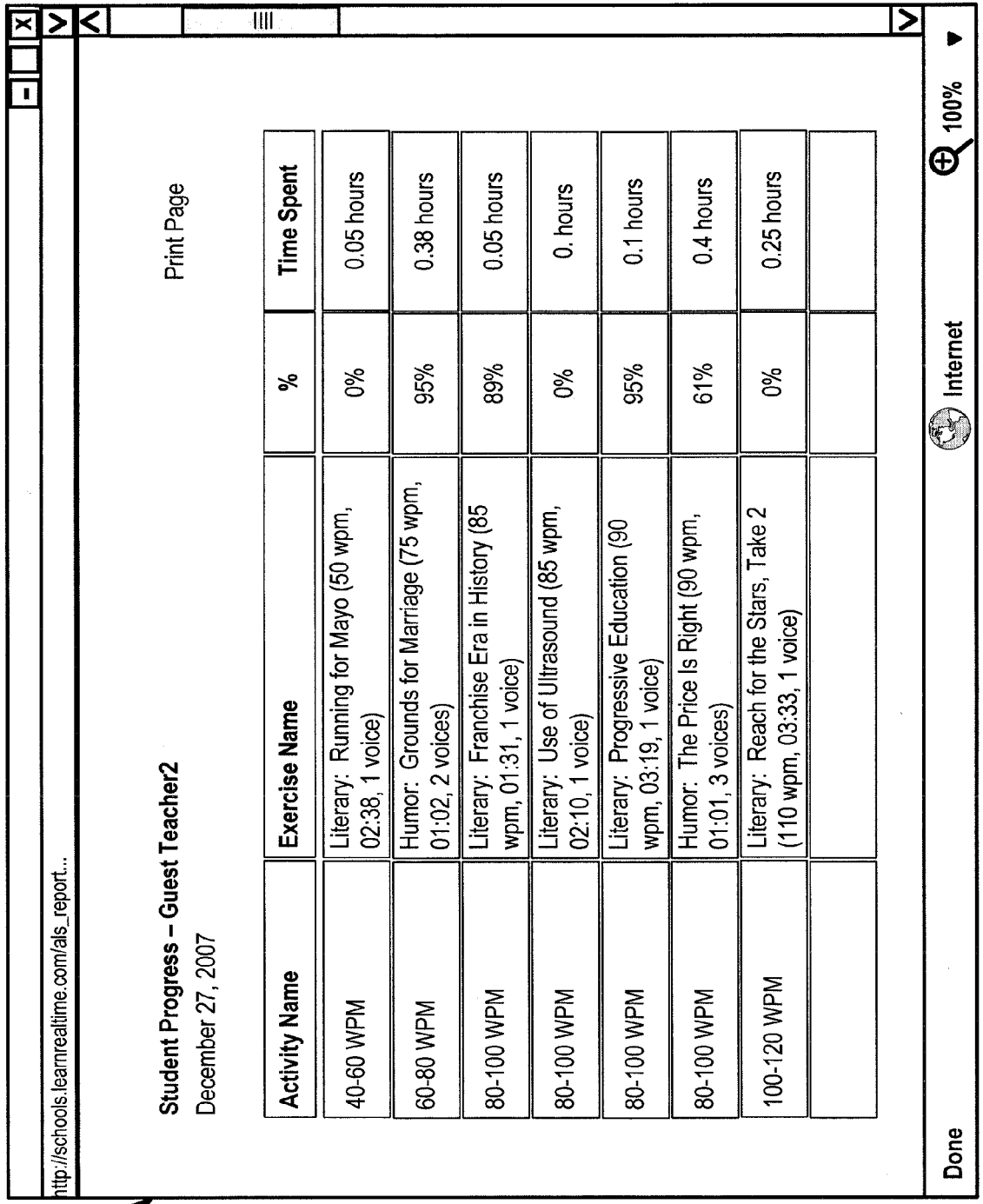

Student Progress – Guest Teacher2
December 27, 2007

Print Page

| Activity Name | Exercise Name | % | Time Spent |
|---|---|---|---|
| 40-60 WPM | Literary: Running for Mayo (50 wpm, 02:38, 1 voice) | 0% | 0.05 hours |
| 60-80 WPM | Humor: Grounds for Marriage (75 wpm, 01:02, 2 voices) | 95% | 0.38 hours |
| 80-100 WPM | Literary: Franchise Era in History (85 wpm, 01:31, 1 voice) | 89% | 0.05 hours |
| 80-100 WPM | Literary: Use of Ultrasound (85 wpm, 02:10, 1 voice) | 0% | 0. hours |
| 80-100 WPM | Literary: Progressive Education (90 wpm, 03:19, 1 voice) | 95% | 0.1 hours |
| 80-100 WPM | Humor: The Price Is Right (90 wpm, 01:01, 3 voices) | 61% | 0.4 hours |
| 100-120 WPM | Literary: Reach for the Stars, Take 2 (110 wpm, 03:33, 1 voice) | 0% | 0.25 hours |

Practice Log – Adamina Alcocke
<<November 2007    December 2007    January 2008>>
0 hrs, 22 min

| Sunday | Monday | Tuesday | Wednesday | Thursday | Friday | Saturday |
|---|---|---|---|---|---|---|
| | | | | | | 1 |
| 2<br>This Day – Details | 3<br>This Day – Details | 4<br>This Day – Details | 5<br>This Day – Details | 6<br>This Day – Details | | 8<br>This Day – Details<br>This Week - Details |
| 9<br>This Day – Details | 10<br>This Day – Details | 11<br>This Day – Details | 12<br>This Day – Details | 13<br>This Day – Details | 14<br>This Day – Details | 15<br>This Day – Details<br>This Week - Details |
| 16<br>This Day – Details | 17<br>This Day – Details | 18<br>This Day – Details | 19<br>This Day – Details | 20<br>This Day – Details | 21<br>This Day – Details | 22<br>This Day – Details<br>This Week - Details |
| 23<br>This Day – Details | 24<br>This Day – Details<br>This Week - Details | 25<br>This Day – Details | 26<br>This Day – Details | 27<br>This Day – Details | 28<br>This Day – Details | 29<br>This Day – Details<br>This Week - Details |
| 30<br>This Day – Details | 31<br>This Day – Details<br>This Week - Details | | | | | |

Select Another Student

December 12 | | Total: 0 hrs, 21 min | % Acuracy
---|---|---|---
Literary: Running for Mayor (50 wpm, 02:38, 1 voice): | | 7 min | 0 %
Literary: Water in Human Systems (60 wpm, 03:55, 1 voice): | | 7 min | 0 %
Literary: Franchise Era in History (85 wpm, 01:31, 1 voice): | | 7 min | 0 % http://schools.learnrealtime.com/als_report...

Progress – Selected Students
December 27, 2007

Print Page

Alcocke, Adamina

| Activity Name | Exercise Name | % | Time Spent |
|---|---|---|---|
| 40-60 WPM | Literary: Running for Mayo (50 wpm, 02:38, 1 voice) | 0% | 0.2 hours |
| 40-60 WPM | Literary: Water in Human Systems (60 wpm, 03:55, 1 voice) | 0% | 0.1 hours |
| 80-100 WPM | Literary: Franchise Era in History (85 wpm, 01:31, 1 voice) | 0% | 0.1 hours |

178

FIG. 21 http://schools.learnrealtime.com/als_calendarTrack_f/viewall.php?view=month&course=1&userid=420

Practice Time: Total for all students

This report displays cumulative practice time for all students combined

<<November 2007　　December 2007　　January 2008>>

ARG

| Sunday | Monday | Tuesday | Wednesday | Thursday | Friday | Saturday |
|---|---|---|---|---|---|---|
|  |  |  |  |  |  | 1 |
| 2<br>2 hrs, 1 min | 3<br>28 hrs, 59 min | 4<br>33 hrs, 34 min | 5<br>30 hrs, 47 min | 6<br>28 hrs, 36 min | 7<br>14 hrs, 48 min | 8<br>16 min |
| 9<br>2 hrs, 21 min | 10<br>25 hrs, 41 min | 11<br>31 hrs, 47 min | 12<br>30 hrs, 33 min | 13<br>22 hrs, 1 min | 14<br>29 hrs, 27 min | 15<br>47 min |
| 16<br>2 hrs, 45 min | 17<br>37 hrs, 18 min | 18<br>33 hrs, 24 min | 19<br>31 hrs, 27 min | 20<br>21 hrs, 47 min | 21<br>9 hrs, 50 min | 22<br>41 min |
| 23 | 24<br>3 hrs, 15 min | 25<br>44 min | 26<br>1 hrs, 52 min | 27<br>9 min | 28 | 29 |
| 30 | 31 |  |  |  |  |  |

FIG. 22

INTERNET BASED LEARNING SYSTEMS

RELATED APPLICATIONS

The present application is a continuation of, and claims priority to and the benefit of, U.S. Ser. No. 11/967,085 entitled "INTERNET BASED LEARNING SYSTEMS" filed on Dec. 29, 2007. The '086 application claims priority to, and the benefit of, U.S. Provisional Application Ser. No. 60/882,927, entitled "INTERNET BASED LEARNING SYSTEMS" and filed on Dec. 30, 2006, which application is incorporated herein by reference in its entirety.

FIELD

This disclosure relates generally to methods and systems related to Internet-based learning systems. As used herein, learning systems refer to systems used by educators to teach others and used by individuals in an effort to learn material. The learning systems may additionally include reporting and performance tracking features that are not directly involved in the students' efforts to learn materials but are important for an educator to adapt the teaching style to facilitate the learning process.

BACKGROUND

Learning systems have evolved rapidly in the past several years. In the not too distant past, educators relied primarily on chalkboards, papers, and pencils. Since then, educators have increasingly implemented teaching methods including projectors, computers, and even Internet-based materials. The simplest use of the Internet in educational endeavors is the use of the communication features of the Internet to send and receive materials from educators to learners. More advanced uses of the Internet involve educators who have begun posting educational materials on the Internet for access by particular learners (i.e., registered students) or by any member of the public. Some of these Web-based educational materials include interactive features that allow the users to test their recollection of the materials and ask questions of their teachers. A variety of tools and programs can be used or combined to enable this level of functionality.

Still more advanced Internet-based educational systems utilize a combination of technologies that have come to be referred to as learning management systems. The conventional learning management systems allow the educator to organize structured educational materials, which may include audio/visual materials and/or text materials. The structured educational materials are delivered through the learning management system in a manner that tracks the individual users of the system and their performance within the educational materials. Conventional learning management systems require a user to login to the learning management system, present educational content to the user over the Internet, track the user's progress through the educational materials (e.g., text or video presentations), and test the user's comprehension and/or recollection through quizzes and/or tests at one or more stages in the presentation. The learning management system then reports the user's progress and performance on the quizzes and tests for monitoring and reporting. The administrator and/or educators with proper access to the learning management system are then able to have ready-access to information about the progress of the learners. The information provided by the learning management system to the educator may allow the educator to better focus instructional efforts and may allow the educator to revise the educational content delivered by the learning management system.

A primary limitation of conventional learning management systems was the requirement that the learners' performance be monitored through quizzes and tests with a defined question and answer structure. Accordingly, the educator was required to identify the aspects of the educational materials that were most important and to develop appropriate questions to enable evaluation of the learners' understanding, comprehension, and/or recollection of the identified aspects. While this testing approach may be appropriate for some subject matters, there are other subjects for which conventional testing through questions and answers is not a suitable evaluation technique. For example, the inventors have identified that there are a number of disciplines that are psychomotor skill-based rather than understanding-based, or that are at least partially dependent on the development of psychomotor skills. Additionally, the inventors have identified that there is no network-based system for receiving, tracking, measuring, and providing feedback during psychomotor skill performance in a real environment, as opposed to a simulated environment. For example, transcriptionists, whether medical coders, court reporters, or others that are expected to write or type accurately and quickly, must learn and understand certain concepts specific to the particular type of transcription work, but the actual transcription performance is a more important indicator of learning than understanding of these concepts. A test of the underlying concepts will not reveal whether the learner can type or transcribe at a particular speed or accuracy.

The example of a transcriptionist is a plainly apparent example of a learning environment where the learners' skills and performance can be readily input into a computer through, for example, a keyboard. However, a number of computer interface devices may be adapted for use with an Internet-based learning management system. For example, court reporters, captioners, and CART providers often transcribe on stenotype machines having customized keyboards and a language that must be translated to become legible English. Interfaces between the stenotype machines and the computer are generally available to convert the stenographers keystrokes into legible text on the computer, which is commonly known as real-time transcription or real-time reporting. Similarly, interfaces may be developed between other external devices and a computer to translate external or real actions to corresponding actions in a virtual or simulated world on the computer. For example, a simulated driving exam may allow a user to operate external controls replicating an actual car and the result of the user's actions may be shown on the computer in the form of a virtual cockpit view or an aerial view of the corresponding car movements. The performance of the user in conducting the simulated vehicle is a more accurate evaluation of whether the user understands the relevant traffic laws compared to the traditional multiple choice format exam. Historically, such exams have been in multiple choice format because of the time required to physically monitor the simulated car's performance on the screen and/or because of the time and danger involved in replicating such actual driving exams in the real world.

Conventional learning management systems, including content files and the learning management engines, require the users' performance to be tracked through conventional question-answer based exams or quizzes. Educators can test to greater or lesser degrees of depth and/or breadth through more questions, more difficult questions, and the like. However, current learning management systems are unable to report on performance of a live-action event, such as transcription, translation, driving, etc.

In the exemplary educational context of transcription education, there have conventionally been just two modes of education and practice. Historically, the teachers would read the practice material text to the students at the desired pace and the class of students would begin the transcription practice. The students and/or teachers would then be able to compare their transcripts with the test materials to find errors. Much of the teacher's time was spent reading practice text to the students and reviewing student's transcripts that were substantially correct, such that the teachers had little time to focus on the student's problem areas or ways to improve the student's performance. More recently, the field of transcription education has begun providing prerecorded dictations, whether on cassette or more modern formats such as mp3 files, for the students to listen to while practicing the transcription. However, the student's transcripts were then sent to the teacher for review and comparison with the actual transcript. Again, the teacher's time and efforts were distracted away from actually teaching and helping the students.

In these conventional methods of teaching transcription, the teachers were left with limited time to track student performance in whatever method seemed appropriate for the teachers. There was no uniform or convenient way to recognize patterns of errors among the students or for a particular student. The teacher's efforts reviewing and comparing transcripts often took so much time that the teacher had little time or motivation to do more than flag the mistakes and allow the student to figure out what was going wrong.

SUMMARY

The systems and methods of the present disclosure have been developed in response to the present state of the art, and in particular, in response to the problems and needs in the art that have not been fully solved by currently available Internet-based learning systems and methods. Accordingly, the present disclosure provides learning systems and methods that evaluate and report a user's performance based on real-time performance rather than isolated questions.

More specifically, the present disclosure provides learning systems and methods adapted to provide learning management systems and methods adapted to present an exercise environment to the user in which the user is able to practice transcription skills through a combination of media presentation (including streaming media) and practice areas. The learning systems and methods are adapted to provide feedback to the user during the practice session to allow the user to improve performance while in the exercise environment. Additionally, the learning systems and methods are adapted to track the users performance in terms of practice time and in terms of accuracy percentage to allow the student and the educator to monitor performance related to effort. Still additionally, the learning systems and methods of the present disclosure may be adapted to track the types of errors committed by the users to enable the users and educators to provide more directed educational experiences and practice sessions to overcome recurring problems.

These and other features and advantages of the present description will become more fully apparent from the following description or may be learned by the practice of the invention as set forth hereinafter.

BRIEF DESCRIPTION OF THE SEVERAL VIEWS OF THE DRAWINGS

In order that the manner in which the above-recited and other features and advantages of the present disclosure are obtained will be readily understood, a more particular description of the present systems and methods briefly described above will be rendered by reference to specific embodiments thereof which are illustrated in the appended drawings. Understanding that these drawings depict only typical embodiments of the systems and methods and are not therefore to be considered to be limiting of its scope, the present technology will be described and explained with additional specificity and detail through the use of the accompanying drawings in which;

FIG. 8 is a display of a learning management environment showing yet another example of a content panel;

FIG. 9 is a display of an exercise environment;

FIG. 19 is a display of a progress report screen;

FIG. 20 is a display of a practice log screen;

FIG. 21 is a display of a student progress report screen;

FIG. 22 is a display of an alternative practice log screen;

DETAILED DESCRIPTION

The presently preferred embodiments will be best understood by reference to the drawings. It will be readily understood that the components, as generally described and illustrated in the figures herein, could be arranged and designed in a wide variety of different configurations. Thus, the following more detailed description of the learning management system, as represented in FIGS. 1 through 23, is not intended to limit the scope of the present disclosure, but is merely representative of presently preferred embodiments.

Figure 1:
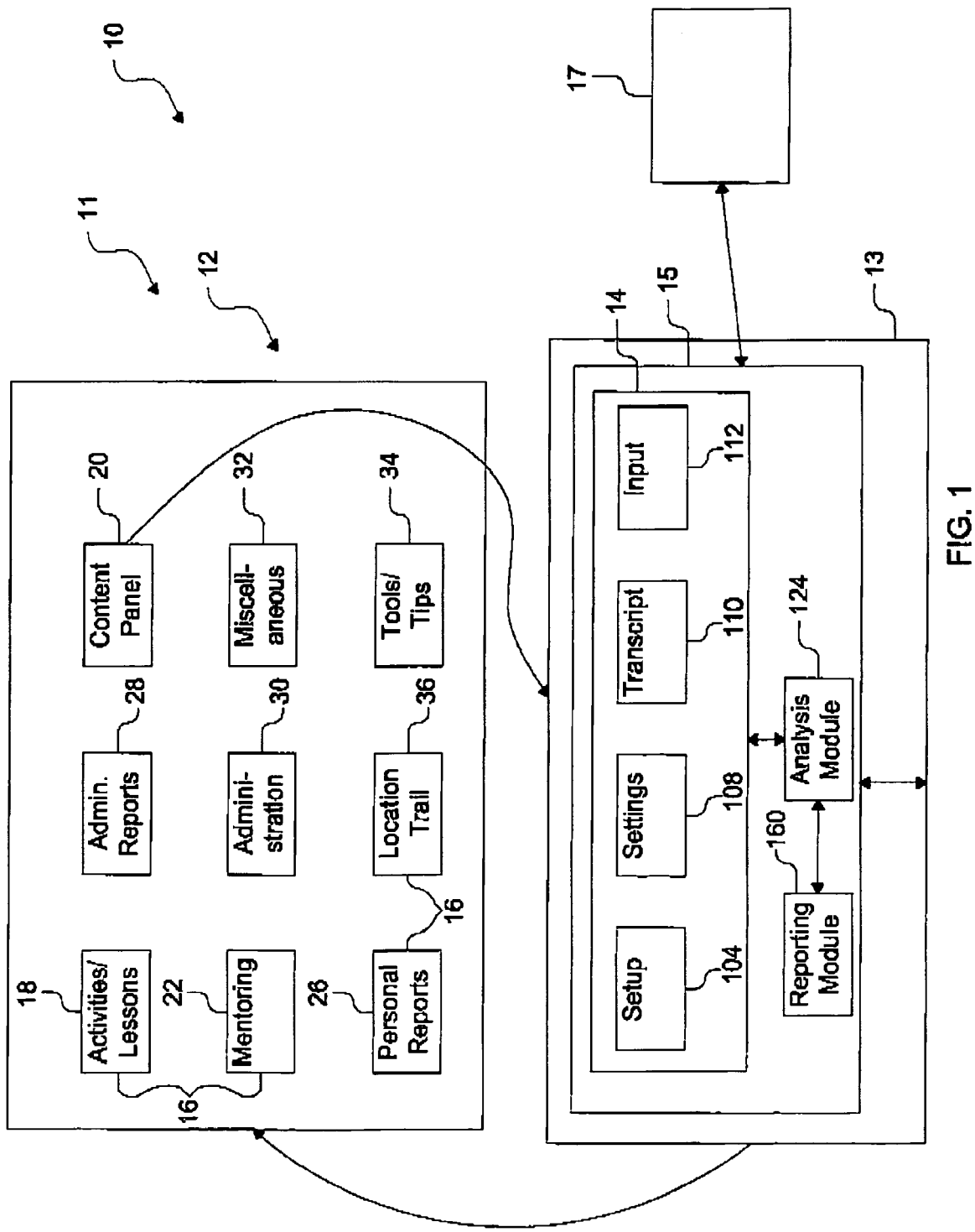
FIG. 1 is schematic block diagram illustrating an example of a learning system according to the present disclosure.

FIG. 1 illustrates a learning system 10 within the scope of the present disclosure. The learning systems 10 within the scope of the present disclosure include a learning management system 11 adapted to produce a learning management environment 12 for the users. The learning systems 10 may also include a navigation engine 13 adapted to produce an exercise environment 14 for the users. The learning management environment 12 and the exercise environment 14 may be adapted to be delivered to the user at any computer having access to the Internet. In a preferred implementation, the learning system 10 is a Web-based application that requires little or no software to be installed on the user's computer other than a standard Internet browser with conventional add-ins, plug-ins, cookies, or other files. Accordingly, the software, hardware, and data that generate the learning management environment and the exercise environment for the users are located at a site remote from the user and installed or saved on servers or drives located remote from the user. In some implementations, the remote nature of the learning system components may be as proximate as within the same company, the same university, the same community, the same building, or even the same room. As used herein, the user is remote from the learning system 10 because the learning system is accessed via the Internet, local area network, or wide-area network rather than through a local installation on the user's computer.

In some aspects of the present disclosure, the learning system 10 may be considered to include the hardware and software that produces the learning management environment 12 and the exercise environment 14 for the user. In other aspects, the learning management system 10 may be considered to include the systems and methods of instructing and learning that are enabled by the hardware and software that provide the learning management environment 12 and the exercise environment 14.

The learning management environment 12 with which the user interacts may be provided by the learning management system 11, which may comprise a learning management engine and associated database(s) (not shown). The learning management system 11 may be Shareable Content Object Reference Model (SCORM) conformant and may be hosted on a network server. The exercise environment 14 may be provided by the navigation engine 13. The navigation engine 13 may be adapted to facilitate the user's access to educational content and interaction with the educational content. In some implementations, and as illustrated in FIG. 1, the navigation engine 13 may communicate with a content engine 15 that in turn is adapted to communicate with a content repository 17 and to produce the exercise environment 14 for the user's interaction. The navigation engine 13 and/or the content repository 17 may be hosted on the same Internet-connected server as the learning management system 11 or on a separate Internet-connected server. For example, the navigation engine 13 and/or the content repository 17 may be within the same firewalled domain as the learning management system 11 or may be outside the learning management system's domain and accessible to the learning management system only through a suitable Internet communication protocol. The learning management system may communicate with the navigation engine 13 through communication methods such as described in one or more SCORM publications. Additionally or alternatively, the learning management system and the navigation engine may communicate with each other through communication protocols based upon, but modified, from the basic protocols outlined and described in SCORM publications. For example, the navigation engine and the learning management system may communicate with each other even when not located on the same domain through the use of one or more communication protocols. Similarly, the content engine 15 and the content repository 17 may be hosted on the same or different Internet connected servers or domains and may communicate with each other through conventional Internet protocols and/or SCORM conformant protocols.

Referring again to FIG. 1, learning systems 10 such as provided to the user through the hardware and software configurations discussed above may provide learning management environments 12 and exercise environments 14 having one or more of a variety of modules 16. FIG. 1 illustrates several exemplary modules 16 that may be associated with one or more of the learning management environment 12 and the exercise environment 14. Other modules may be incorporated in learning systems 10 within the scope of the present disclosure. For example, a user login module (not shown) may be considered a separate module that controls user access to the learning management environment. Alternatively, user access controls may be incorporated into the Web-based application as a user login required before gaining access to the Web site hosting the learning system 10.

Figure 4:
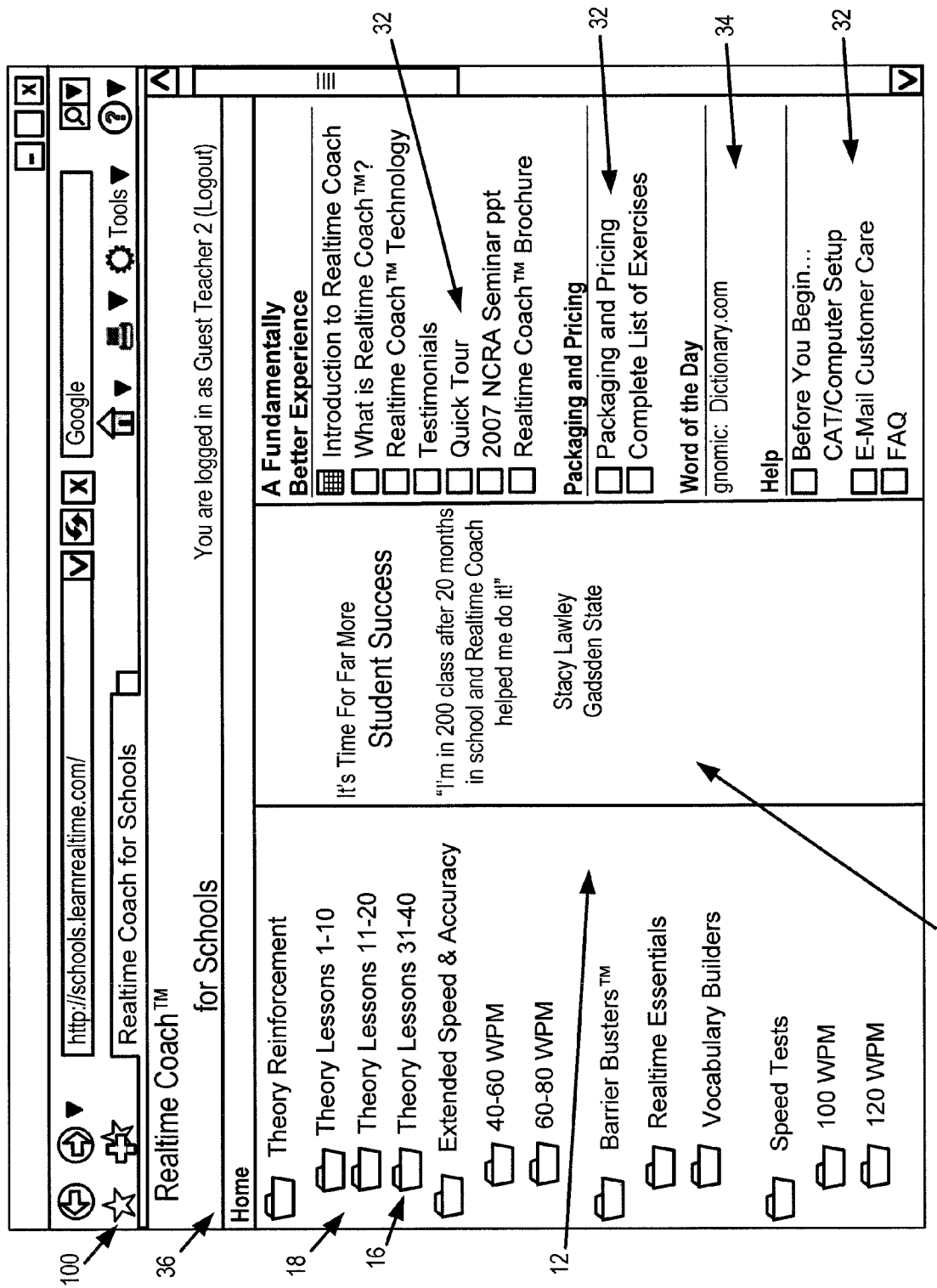
FIG. 4 is a display of an alternative learning management environment.
Figure 5:
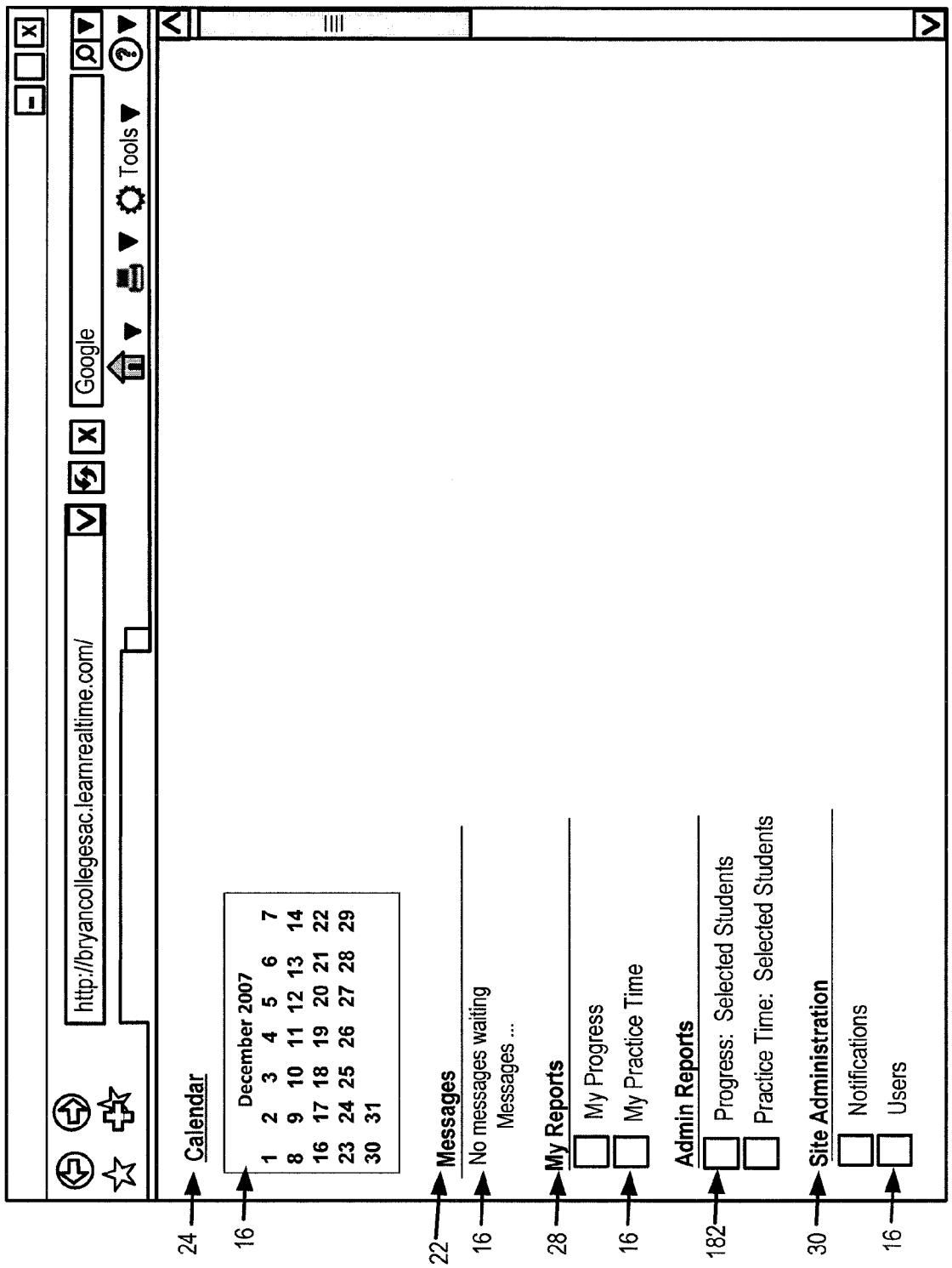
FIG. 5 is a display of an additional portion of the alternative learning environment illustrated in FIG. 4.

Once the user gains access to the learning system 10, the user is presented with the learning management environment 12, one example of which is shown in FIGS. 4 and 5, as well as subsequent figures. As illustrated schematically in FIG. 1 and representatively in FIG. 4, the learning management environment 12 may provide an activities/lessons module 18 that displays lessons and/or activities that are available to the user. The activity/lessons module 18 may be adapted to illustrate content or activities in the content repository to which the learning management system has pointed through the navigation engine 13 and/or the content engine 15. Alternatively, the content or activities displayed to the user in the activities module 18 may be limited to a subset of the activities in the content repository, which may be defined by the user's login and/or the user's progress thus far through the content in the content repository. As described above, the content repository 17 may include one or more content packages that include structured educational materials, which structure may limit users to certain content at certain times or under certain conditions, such as attaining a predetermined performance level in prerequisite educational material. The activity module 18 may present the available lessons/activities in a hierarchal or topical manner to allow the user to select particular chapters, subdivisions, or topics of the content. Additionally or alternatively, the activities module 18 may present merely high level descriptions of the available content for selection by the user; the user may then be able to drill down to particular subdivisions of the educational material through interacting with the content panel module 20 described below.

As seen in FIG. 5, which is a continuation of the screen shown in FIG. 4, and as illustrated schematically in FIG. 1, learning management environments 12 within the present disclosure may include mentoring modules 22, calendaring modules 24, personal reports modules 26, administrative reports modules 28, and administrative options modules 30. Each of these modules and their functions will be described in greater detail with reference to one or more of the remaining figures. FIG. 1 illustrates schematically that each of these communication and reporting modules and associated features are provided in the learning management environment 12 by the learning management system 11 and may be based at least in part on information obtained from the exercise environment and the content engine 15.

Additionally, with reference to FIG. 1 and to FIG. 4, the learning management environment 12 may provide one or more additional modules 16, illustrated in FIG. 1 as miscellaneous modules 32, directed towards help functionality or communication directly with the learning system provider, developer, or operator. Additionally, FIG. 4 illustrates one representative tools/tips module 34 in the form of a "word of the day" module. Other tools and tips modules may be implemented that are more suitable for particular subject matters. FIG. 4 also illustrates an exemplary implementation of a location trail indicator 36. The function of the location trail indicator 36 is better illustrated in FIGS. 6-8 where the learning management system 11 is pointing to different educational materials via the content engine 15 and the content repository 17. More specifically, the location trail indicator 36 may be associated with the content panel module 20 to show where the user is looking within the content available from the content repository.

Figure 6:
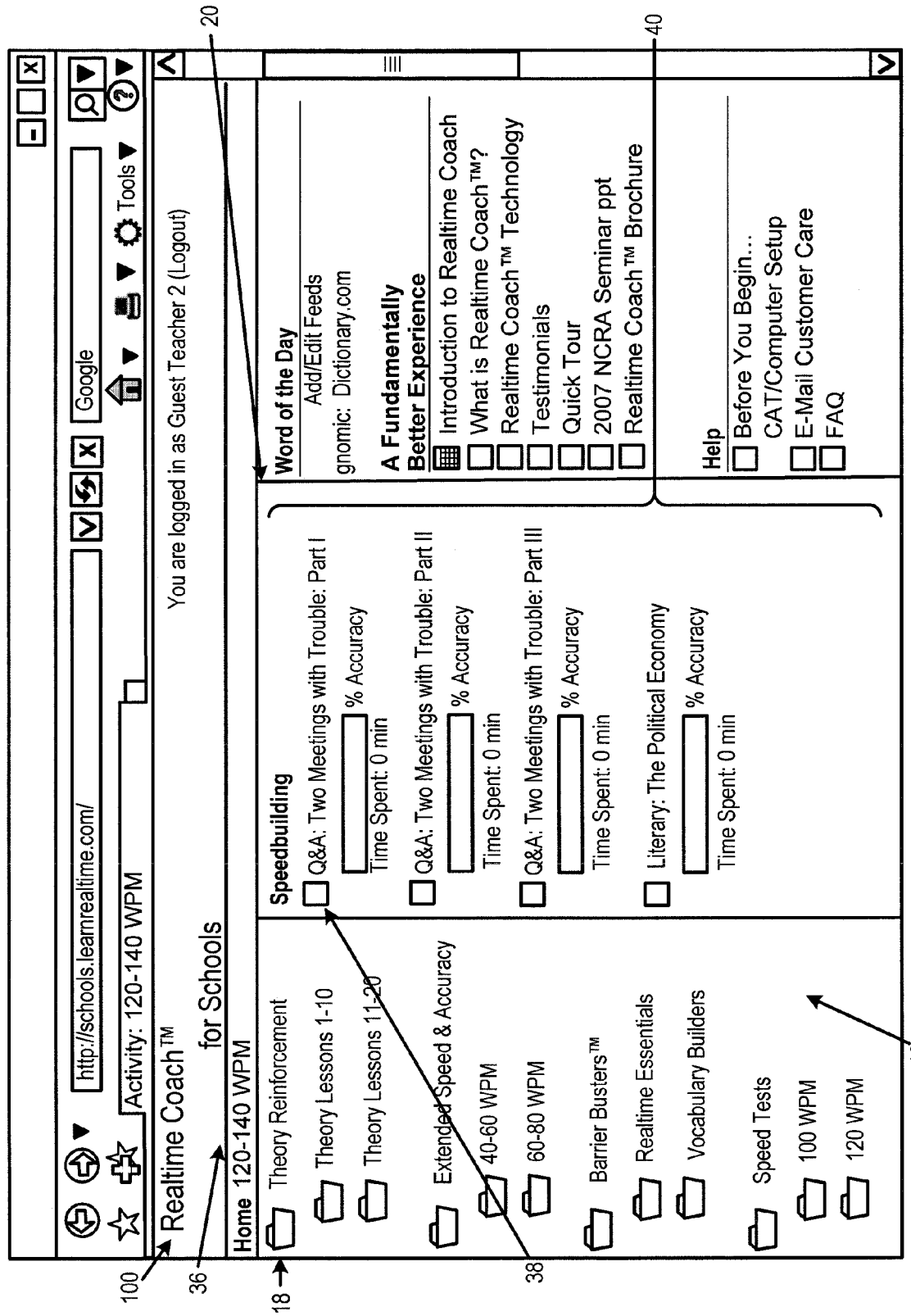
FIG. 6 is a display of a learning management environment showing one example of a content panel.

With continued reference to FIGS. 1-2 and 4-6, a common method of interacting with the learning system 10 will be described. A user who logs into the learning management environment 12 may view a list of available exercises in the activities module 18. Upon selecting an activity from the list in the activities module 18, the content panel 20 may be populated or filled with information from the content repository showing the exercises 38 available within the activity selected by the user. As seen in FIG. 6, the exercises 38 may be grouped into one or more lessons or chapters 40 within the activity selected by the user. The information presented in the content panel 20 is part of the content packages or files stored in the content repository and accessed by the navigation engine 13 and/or the content engine 15 for presentation in the learning management environment 12. The educational materials presented by the learning system 10 may dictate a variety of configurations or structures for the content packages or the preferences of the educator may lead to a particular structure for the exercises in the content packages. The content panel module 20, the activities module 18, and the location trail indicator 36, together or separately, may help guide the user through the educational materials. The user may then select a particular exercise 38, such as by clicking on one or more links or buttons. The operation and interaction upon selecting a particular exercise will be described in more detail below, but may be summarized as causing an exercise environment 14 to open.

Figure 2:
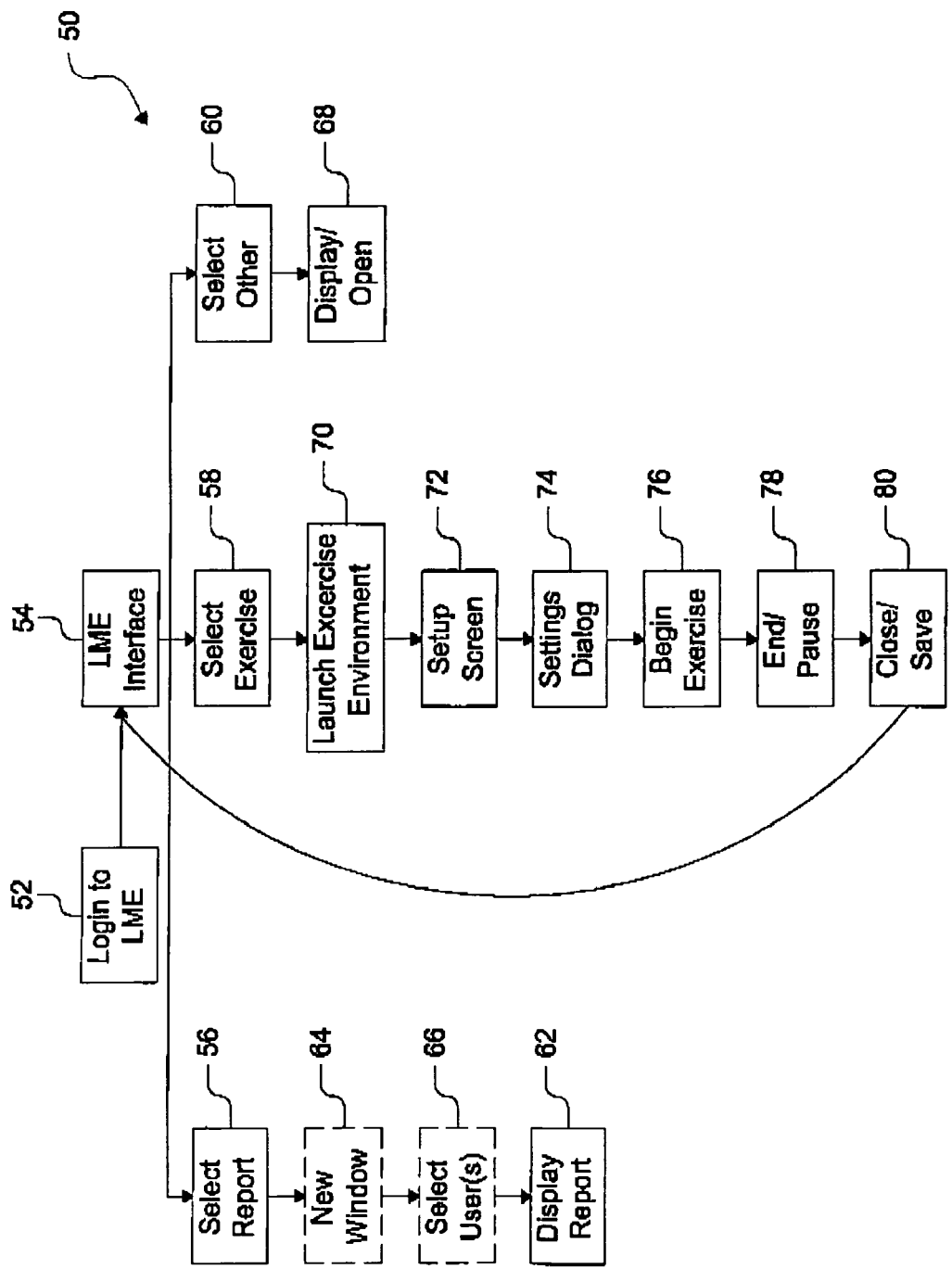
FIG. 2 is a schematic block diagram illustrating at least some of the functions available to a user in an example of a learning system.

FIG. 2 presents a schematic flow diagram 50 of various operations and interactions available with learning management environments 12 of the present disclosure. For example, and as discussed above, the user's interaction with the learning management system 11 may begin with a login 52 to the learning management environment 12 resulting in access to the learning management environment interface 54. From the learning management environment interface 54, the user may select any one or more of the modules described above and shown in the figures. Three such options are shown in FIG. 2, including selecting a report 56, selecting an exercise 58, and selecting another module 60.

In the event that the user selects a report 56, the learning management environment 12 may proceed directly to display the report 62. Additionally or alternatively, the learning management environment 12 may be adapted to open a new window 64 in which the report is displayed. Moreover, depending on the report selected by the user, the learning management environment may be adapted to prompt the user for additional information 66, such as users, activities, dates, report display type, and/or other information for the report. As seen in FIGS. 4 and 5, a variety of personal reports 26 and administrative reports 28 may be selected from the learning management environment 12 and generated by the learning management system 11. Some of the possible reports are illustrated in the figures of the present application; others may be possible. The user's interaction with the learning management environment to generate one or more reports may vary depending on the nature of the report being requested and/or on the nature of the user (e.g., learner, educator, administrator, etc.).

With continued reference to FIG. 2 and similar to the functionality of the learning management systems after a user selects a report 56, when a user selects one of the other modules shown in FIGS. 1 and 4 the learning management system may display and/or open 68 one or more new windows displaying the information and features requested. For example, if the user requests to contact the provider of the learning system 10, the user may select the desired module at 60 and the learning management system 11 may open a new window having email/messaging functionality for the user to send a message to the provider. Additionally or alternatively, additional methods of contacting the provider may be provided in the same window as the learning management environment, such as by populating the content panel 20 with information and/or messaging functionality.

With continuing reference to FIG. 2, in the event that the user elects to select an exercise 58, the learning management system 11 may be adapted to launch the exercise environment 70, such as by opening a new window containing the exercise environment 14. Additionally or alternatively, the learning management environment 12 may be adapted to launch the exercise environment 14 in a new tab within the same window or may reload the window with the exercise environment 14. Once in the exercise environment 14, the user may encounter a variety of options and screens, at least some of which may be dependant on the type of educational material being presented in the exercise. For example, in some implementations, the exercise environment 14 may include the presentation of streaming audio, streaming video, and/or scrolling text. Additionally or alternatively, some exercise environments 14 may include one or more setup or configuration screens prior to actually participating in the exercise. As illustrated schematically in FIG. 2, some implementations of the exercise environment 14 may lead the user to a setup screen 72. The setup screen 72 may include a variety of options, information, and/or data input options, which may vary based on the subject matter of the educational materials. Additionally or alternatively, the exercise environment 14 may lead the user to a settings dialog 74, which may be on a separate window or in the same window as other aspects of the exercise environment. The settings dialog 74 may allow the user to set one or more of the options for the exercise environment, such as the reporting options and/or accuracy options, such as will be better illustrated in connection with the subsequent figures.

Finally, with continuing reference to the schematic illustration in FIG. 2, the exercise environment 14 may include controls to allow the user to begin the exercise 76, to end and/or pause the exercise 78, and to save and/or close the exercise 80. Other user controls may be provided depending on the context of the educational materials. In some implementations, in addition to the manual save option, the exercise environment 14 may be adapted to automatically save information periodically while the user is interacting within the exercise environment, which saves may be triggered by time, by events, or by some other factor. Additionally or alternatively, the exercise environment 14 may be adapted to automatically save information about the exercise session when the user closes the exercise environment. The save function in the exercise environment, which may be executed by the content engine, the navigation engine, or some combination of components, may be configured to save information to a local memory at the user's computer or, more preferably, may be configured to save data and information regarding the exercise environment back to the learning management system 11. For example, the learning management system, and more particularly the learning management engine and its associated databases, may include databases that store information and data regarding each of the users registered with the learning management system. The databases may include information about the user and information about the user's progress and performance in the exercises to which the user has access. By saving information about the user's progress and performance in the exercise environment back to the learning management system, the learning systems of the present disclosure are able to guide the learning experience and to report on the learning experience.

The foregoing discussion of schematic block diagrams provides a high-level overview of the functionality of the present learning systems that may be adapted for use with any educational subject matter. As noted above, the present learning systems 10 are particularly adapted for educational materials directed to teaching and/or practicing skills rather than just recalling information, and particularly to skills that require real-time accuracy and/or speed, such as psychomotor skills, FIGS. 3-23 provide exemplary screen captures of a representative Web-based learning management system adapted to teach and allow learners to practice skills related to transcription services, including keyboarding and use of a steno machine, FIGS. 3-23 will now be described to illustrate an exemplary user's experience with learning management systems within the present disclosure. Variations from the usage presented below that allow a learning management system to track and report on a user's skill-based performance rather than recall based performance are within the scope of the present disclosure.

Figure 3:
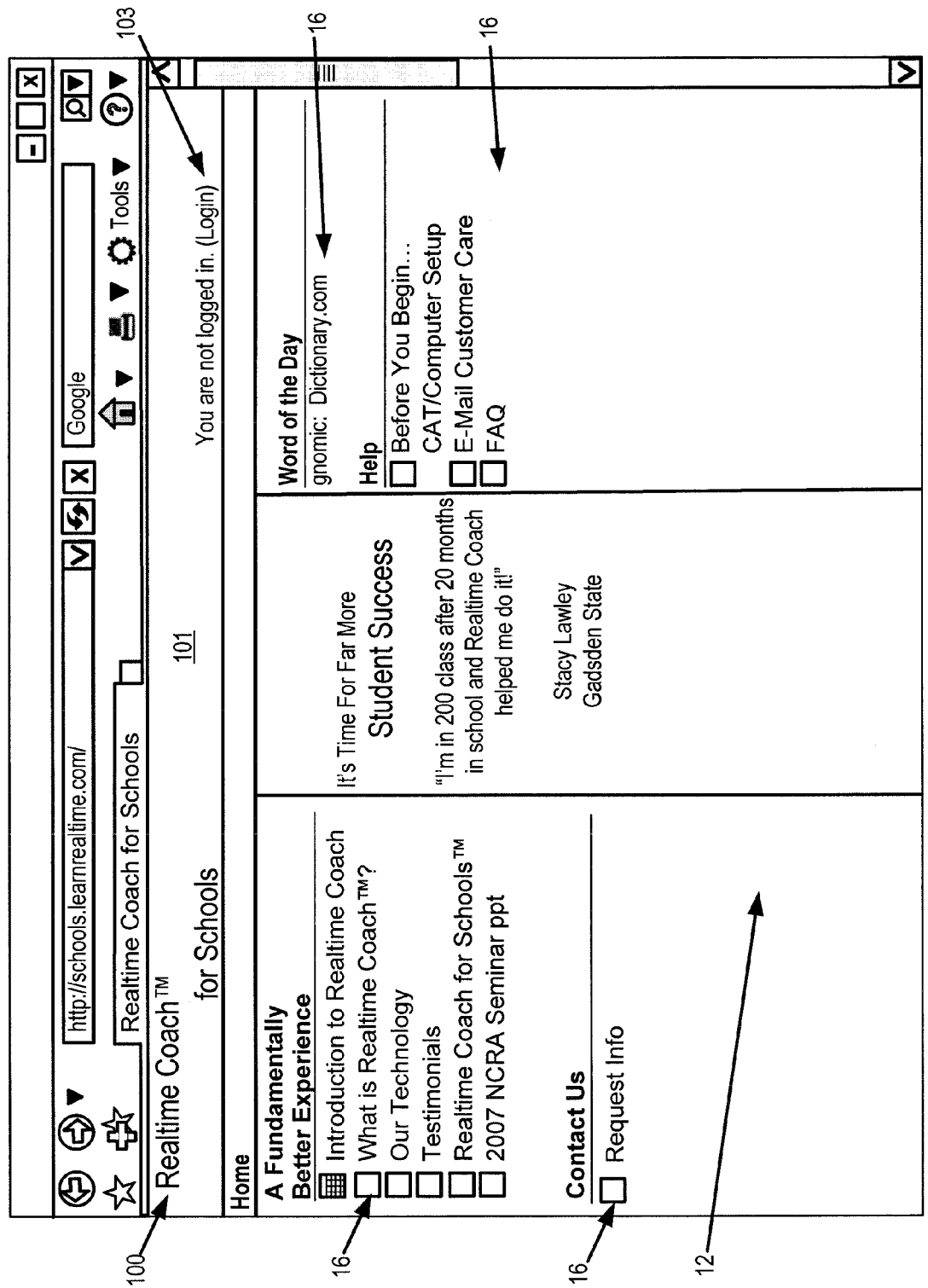
FIG. 3 is a display of a learning management environment.

FIG. 3 illustrates a learning management system user interface screen 100 such as may be presented before the user logs into the system. As seen in FIG. 3, the user interface screen 100 is formatted and laid out similar to the learning management environment 12, as will be seen in subsequent figures. However, as the user has not logged in to the learning system 10, the system does not present exercises or other reporting features that are available to a registered and logged-in user. Accordingly, the user interface screen 100 shown in FIG. 3 may be considered an introduction screen 101 and may include a login prompt 103 or other method to allow the user to log into the learning management system 10. Additionally, the introduction screen 101 may include any variety of modules 16 to provide the visiting user to learn about the learning management system 10.

Once the user logs into the learning system 10, the user interface screen 100 may be updated to present the learning management environment 12 shown in FIG. 4 and discussed above in connection with FIG. 1. As can be seen by comparing FIGS. 3 and 4, many of the modules 16 from FIG. 3 have now been moved to the right-hand side of the learning management environment 12 and are referred to as the miscellaneous modules 32 and tips modules 34 discussed above. As can be seen by the location trail indicator 36, the user interface screen 100 of FIG. 4 shows the learning management environment 12 at the "home" location, which is generally the location in a content package prior to the user selecting an exercise or a particular subdivision of the education materials contained in the content package. FIG. 4 illustrates that the home state may provide a blank content panel module 20 or one that includes simple graphics and a welcome screen. Additionally or alternatively, the content panel module 20 may display or present any suitable Web-enabled content (i.e., audio, video, text, etc.) at the home state. For example, a message from the educational institution and/or educators may be presented in the content panel when the learning management environment is at the home state.

Other aspects of FIGS. 4 and 5 were described previously, including the various modules 16 that may be incorporated into the learning management environment 12. In some implementations of the learning management system 11, the modules presented in the learning management environment 12 may be customized for the user and/or for the location or context of the content in the content panel 20 of the learning management environment. For example, the admin reports module 28 may not be available to a user logged in as a learner rather than as an administrator. Additionally or alternatively, the elements of the modules 16 may vary based on one or more factors. For example, there may be multiple categories of administrators, such as institutional administrators and educators, and each category may be entitled to different reports and/or access to the learning system 10. For example, an educator may not need or want access to reports regarding the enrolled users (one of the options shown in the admin reports module 28) and this option may not be available to a user logged in as an educator.

FIG. 6 was also described briefly above. As shown in FIG. 6, the user has selected one of the activities presented in the activities module 18 and the content panel module 20 presents the exercises 38 available within that activity. As illustrated in FIG. 6, the exercises 38 within the activity may be grouped in chapters 40 or lessons having a common theme. The learning systems 10 of the present disclosure may be adapted to customize the material presented in the content panel module 20 to the user logged in to the system. For example, an educator may prefer to limit the available exercises 38 within an activity according to the user's position or progress within the materials. As one illustrative example, the learning system 10, whether through the learning management system 11, the navigation engine 13, or some combination of elements of the learning system 10, may be adapted to not present the material and exercises of lesson three until the user has completed the exercises of lesson two. Similarly, the learning system 10 may be adapted to withhold the materials of lesson three until a predetermined time has been spent on the exercises of lesson two or until a predetermined accuracy percentage has been reached in each of the exercises of lesson two. Similar adaptations may be made according to the educator's preferences. Additionally or alternatively, the list of activities available in the activities module 18 may be similarly customized according to the educator's preferences. Still additionally or alternatively, the learning system 10 may be adapted to present all of the activities 18, lessons 40, and exercises 38 to the user regardless of the user's progress in the materials, but may deactivate the links to the underlying materials. Such an approach may be preferred to allow the user to see the map of where the user will be going in the course while still guiding the user through the materials at the educator's preferred pace. Similarly, the educator may prefer to give the user access to any and all of the content for a self-guided educational experience. Such configuration options in the learning system may be determined by the nature or subject matter of the educational material being presented through the content packages of the learning system.

FIG. 6 also illustrates the function of the location trail indicator 36. By comparing the location trail indicator 36 shown in FIG. 4 and the location trail indicator 36 shown in FIG. 6, it can be seen that the location trail indicator 36 is adapted to show the user where the user is in the content package presented in the content panel module 20. In some implementations of the present learning systems 10, the content packages, which are stored in the content repository and which provide the content for the activities module 18 and the content panel module 20, may be configured to provide content in various nesting levels. For example, the content package may be adapted to provide activities at the highest level; each activity may include multiple lessons, and each lesson may include multiple exercises. Rather than presenting the exercises in a grouped manner as shown in FIG. 6, the exercises may be nested below the lesson so that the user opens the lesson, and possibly reviews educational materials, before accessing the exercises. In such configurations, the location trail indicator 36 may help the user recognize where the particular content or exercises fit into the larger content package, and therefore how the particular content and exercises relate to the other materials being presented. Additionally, the location trail indicator 36 may provide links to facilitate the navigation of the content provided to the user.

Figure 7:
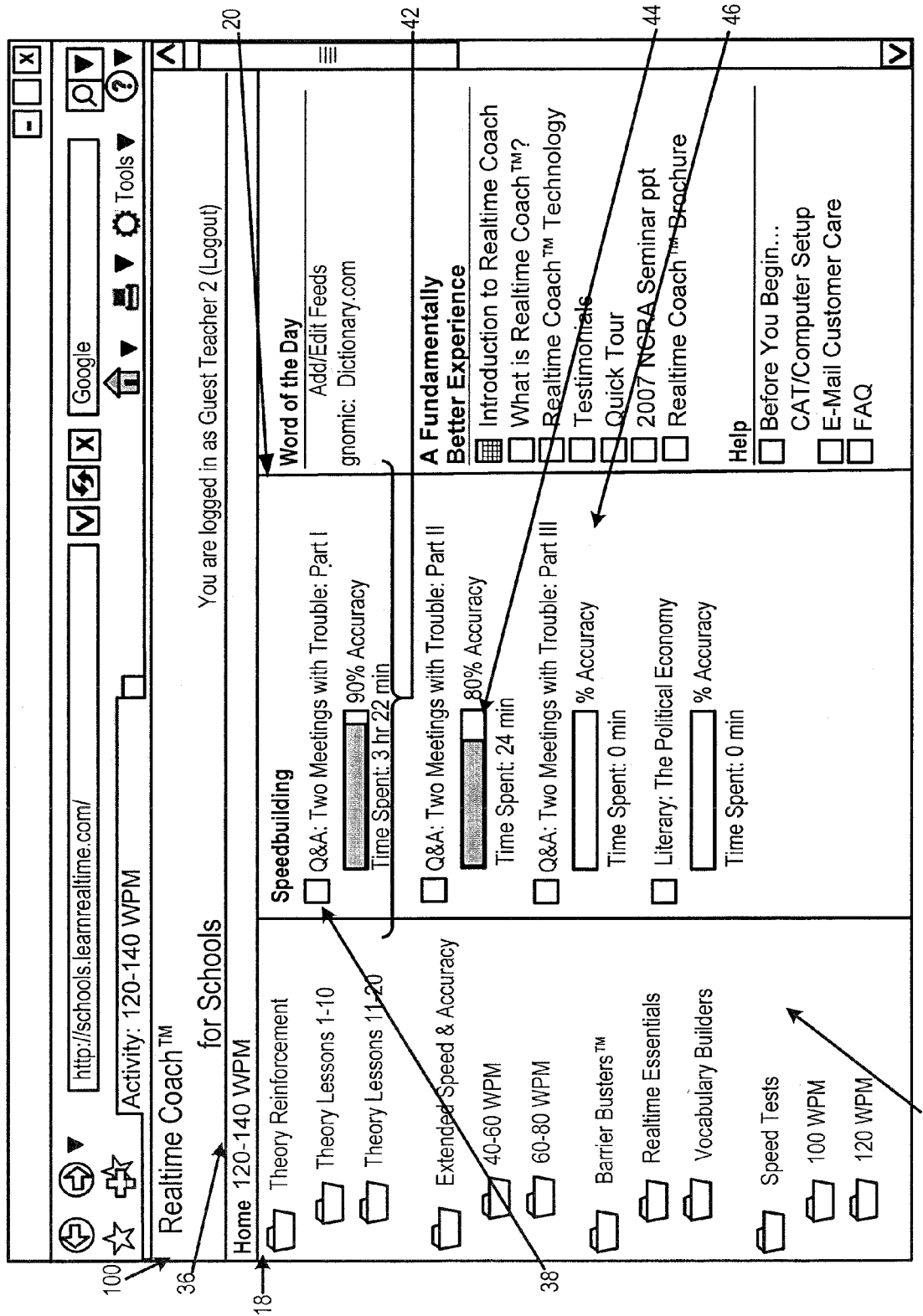
FIG. 7 is a display of a learning management environment showing another example of a content panel.

FIG. 7 illustrates a representative user interface screen 100 showing a learning management environment 12 wherein the user has selected a different activity from the activity module 18 compared with the learning management environment of FIG. 6. Comparing FIGS. 6 and 7, it can be seen that selecting a different activity from the activity module 18 causes the information and content of the content panel module 20 to change and causes the location trail indicator 36 to be updated to reflect the content of the content panel module 20.

FIG. 7 illustrates more clearly the interaction between the learning management environment 12 and the exercise environment 14. As introduced above, the exercise environment 14 is where the user participates in exercises that test the user's skills and understanding, comprehension, or recollection of the subject matter presented in the educational materials of the content packages. The content panel module 20 of FIG. 7 illustrates that the individual exercises are accompanied by two different progress indicators 42: the percentage accuracy indicator 44 and the time spent indicator 46. The data that controls and updates these progress indicators 42 is generated in the exercise environment 14, such as by the content engine 15 and/or the navigation engine 13, as the user interacts with the content from the content repository. The data from the exercise environment is communicated to the learning management system (e.g., to the learning management engine and/or associated databases) and is presented to the user via the progress indicators 42. As can be seen in FIG. 7, each of the exercises 38 are accompanied by separate progress indicators 42. While percentage accuracy indicators 44 and time spent indicators 46 are illustrated, other progress indicators 42 may be provided that may be more suitable for the subject matter of the educational materials being presented. Similarly, while two progress indicators 42 are shown, greater or fewer progress indicators may be implemented.

Figure 8:
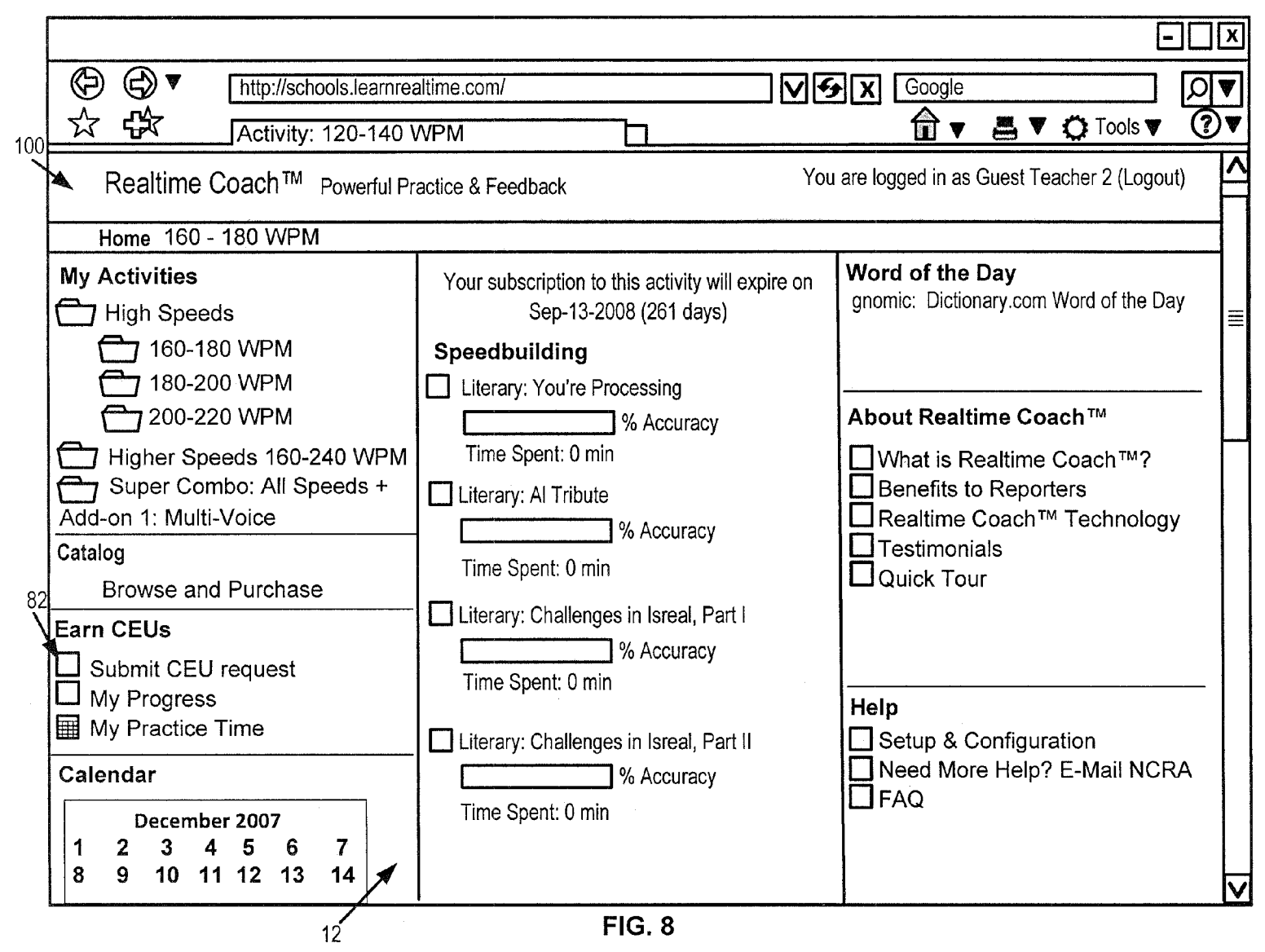

FIG. 8 illustrates still additional aspects of the learning management environment 12 that may be presented to the user via a user interface screen 100. Similar to the learning management environments 12 discussed above, the learning management environment of FIG. 8 includes a content panel module 20 that provides access to one or more exercises 38. FIG. 8 illustrates that each of the exercises 38 may be presented with more information regarding the nature and purpose of the exercise in addition to the title of and link to load the content in the exercise environment. Additionally, FIG. 8 illustrates that additional or alternative modules 16 may be incorporated into the learning management environment 12 and that the modules can be arranged in any suitable manner. For example, the learning management environment 12 may be adapted for use by practicing professionals rather than by students and the learning management environment 12 may include a continuing education module 82 to assist the professional in obtaining credit for efforts spent in the learning management system 10.

Once the user selects an exercise 38 from the content panel module 20, a new window may open presenting the exercise environment 14 in a pop-up user interface screen 102. FIG. 9 illustrates one example of the new pop-up window that may be opened for the exercise environment 14. Additionally or alternatively, the learning system 10 may be adapted to load the exercise environment 14 into a new tab in the same window or to replace the learning management environment 12 with an exercise environment 14.

In the pop-up user interface screen 102 of FIG. 9, the user is presented with the exercise environment 14 in the form of a tabbed window having a set-up tab 104 and an exercise tab 106. The set-up tab 104 is shown in FIG. 9 and illustrates an exemplary configuration of a set-up screen 72 such as discussed in connection with FIG. 2. The setup tab 104 is also illustrated schematically in FIG. 1 as one aspect of the exercise environment 14. The set-up tab 104 of FIG. 9 provides background information for the user and presents the user with an interface to set-up any equipment that may be associated with the exercise, such as the steno machine in the exemplary exercises for court reporters. Similar set-up screens 72 may be customized for the user depending on the context of the educational materials. Additionally or alternatively, the set-up tab 104 and/or set-up screen 72 may be omitted from the exercise environment 14 as a separate tab or screen and the relevant information for the exercise may be communicated via a single window exercise environment 14.

Figure 10:
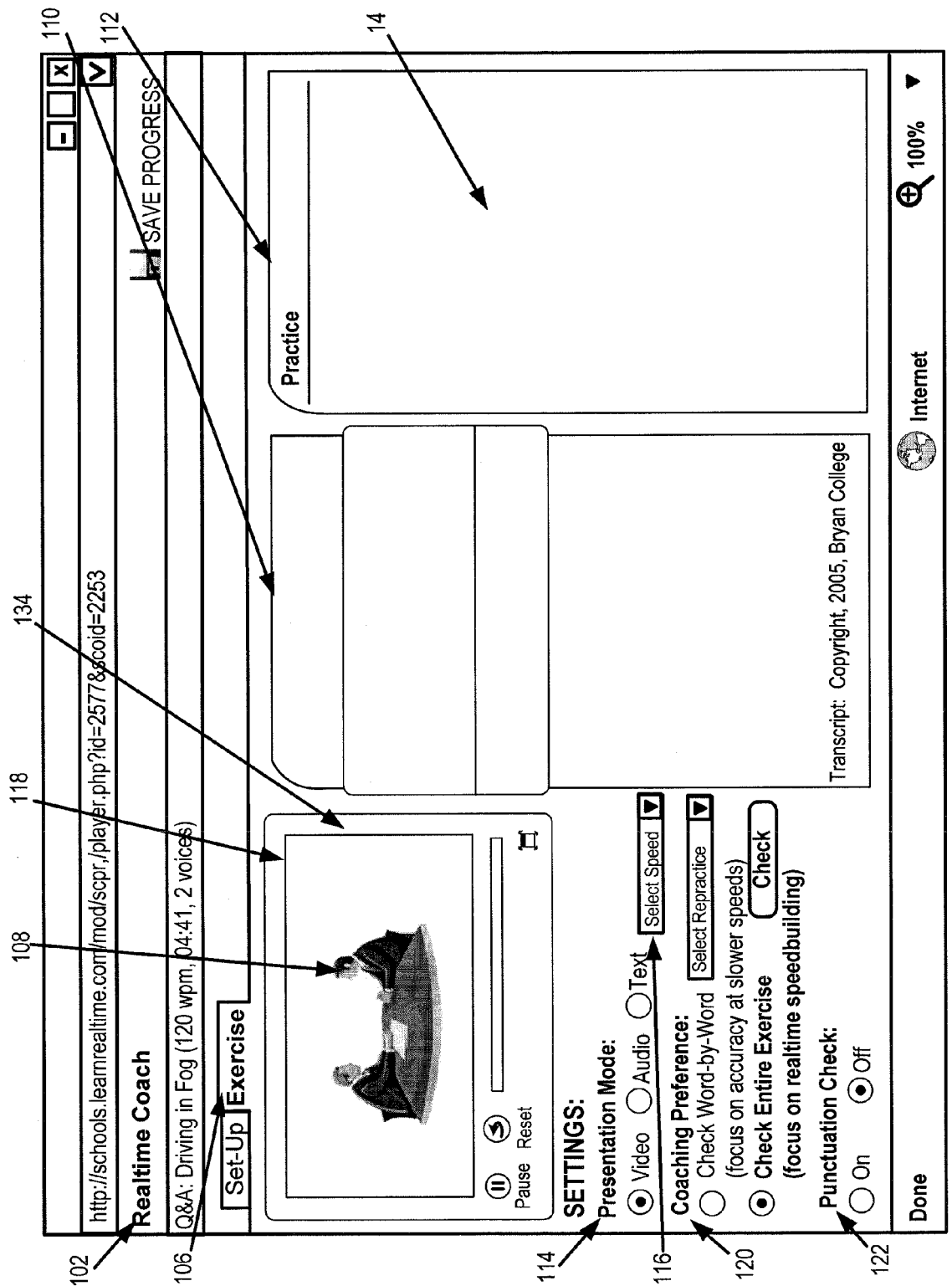
FIG. 10 is another display of an exercise environment.

FIG. 10 illustrates the exercise environment 14 having the exercise tab 106 displayed in the pop-up user interface screen 102. The illustrated, exemplary exercise tab 106 of FIG. 10 presents the user with a settings panel 108, a transcript panel 110, and an input panel 112, each of which may be generated by the content engine 15 based on data obtained by the content engine 15 from the content repository 17. The settings panel 108 may provide the user with an opportunity to adjust the characteristics of the exercise in any number of manners to affect the function of the content engine 15 while the user is in the exercise environment. As illustrated, the settings panel 108 includes the option of changing the presentation mode through the presentation mode controller 114 to select between video mode, which includes audio, audio only mode, or text only mode. The content engine 15 may read data from the content files in the content repository to determine which modes should be available for the presentation mode controller 114 for a particular exercise. For example, some exercises may not be adapted for video mode. Additionally, the settings panel 108 allows the user to adjust the speed 116 of the exercise when done in a text only mode. The text only mode will be described in more detail below, but it is noted here that the speed selling 116 may allow the user to vary the text scrolling speed in any number of gradations, such as nine distinct speeds, ranging from about 40-50 words per minute to about 220-240 words per minute. The speed of the audio and video content may be set by the exercise selected by the user as in the illustrated example or may be set by the user. In the illustrated example, the user selected an exercise having an audio and video speed of 90 words per minute, as seen in the video playback screen 118. In the example context of court reporting, the video playback screen 118 may be provided to allow the user to practice using visual cues to improve transcription speed and/or accuracy. In other contexts, the video playback screen 118 may provide the user with other visual inputs and/or feedback.

The settings panel 108 of the exercise tab 106 shown in FIG. 10 also allows the user to select the coaching preference mode 120, such as checking word-by-word or checking the entire exercise. Additionally, the illustrated exercise tab 106 includes a punctuation check option 122 that allows the user to select the level of accuracy with which to check the exercise. In the context of the court reporting example, when the punctuation check option is enabled by the user, the content engine 15 may be adapted to compare the user's input to the correct transcript and record any differences between the two as an error, including differences in capitalization, commas, dashes, semi-colons, etc.

Referring back to FIG. 1 and with continuing reference to FIG. 10, the settings panel 108, and particularly the settings regarding the coaching preferences mode and the punctuation check option, may be adapted to communicate with an analysis module 124 of the content engine 15. The analysis module 124 is adapted to compare the transcript that underlies the exercise (and that is eventually displayed in the transcript panel 110) with the data entered by the user in the input panel 112 in determining the score or performance of the user. In the exemplary context of court reporting, the analysis module 124 may be adapted to compare each word or character of the transcript underlying the exercise with each word input by the user into the user panel 112. The exercises in the court reporting context may be based around a known speech or dialog for which a transcript is prepared and stored in the content repository. The analysis module 124 may be run by the content engine 15 in the background while the user is in the exercise environment. More detail regarding the analysis module 124 is provided below.

Figure 11:
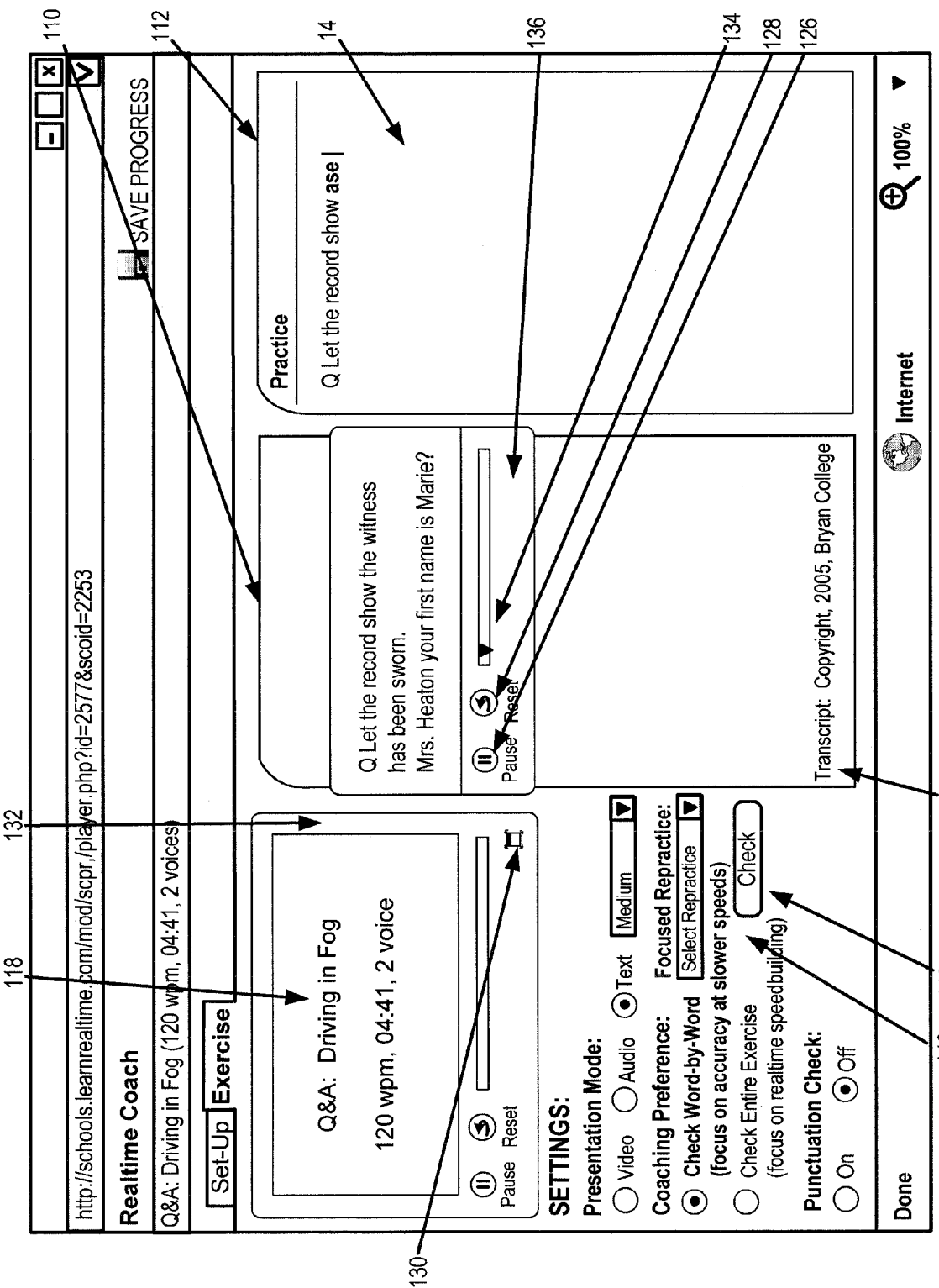
FIG. 11 is another display of an exercise environment.

FIG. 11 illustrates the exemplary exercise environment 14 after the user has begun the exercise in video mode. As illustrated, the video playback screen 118 has begun to stream audio and video content to the user's screen, which the user is expected to practice transcribing into the input panel 112 through the use of a keyboard or other input device. The video playback screen 118 includes a play/pause button 126 and a reset button 128 as well as a screen size toggle button 130. The video playback screen 118 is one component of a streaming media player 132 that is dynamically loaded by the content engine 15 that produces the exercise environment for presentation of the content from the content repository. The streaming media player 132 may be adapted to have any variety of features to facilitate the streaming of media to the exercise environment, either from the content repository or from other locations.

In an exemplary configuration of the streaming media player 132, the media player may be adapted to dynamically load the intro screen 134 shown in FIG. 10, which presents basic information about the exercise. The intro screen 134 may be loaded into the media player when the user selects the exercise from the learning management environment and may be loaded from an XML file stored within the content package. A preferred streaming media player 132 may be adapted to include a stream ahead feature whereby the streaming media player begins streaming the media file to a local cache for smoother streaming in the background while the user is still adjusting the settings or the setup of the exercise. The media file presented by the streaming media player 132 may be any suitable media file, with FLV files (Flash video format) being presently preferred.

When the user is ready to begin the exercise, the user presses the play/pause button 126 to cause the media player 132 to load and play the streaming media, which may have been streamed to a local cache as described above or may be streamed over an active Internet connection. In some implementations, the streaming media player 132, on its own or as directed by the content engine 15, may be adapted to load a standardized audio file for playback prior to initiating the playback of the media for the exercise, which may be desired to allow the user to prepare for the exercise.

The user may press the play/pause button again to pause the playback and subsequent clicks of the play/pause button 126 may toggle playback. The reset button 128 may reset the exercise and the media playback to the beginning. FIG. 11 also illustrates a slider bar 134 combined with a streaming progress bar 136. As is conventional in media players, the slider bar 134 may be adapted to allow the user to move forward and backward within the downloaded media. The streaming progress bar 136 may include a colored (or other form of indicator) bar that advances in front of the slider bar location to show the progress toward downloading the entire streaming content to the local cache. Additionally, the user may press the screen size toggle button to toggle between large and small video playback screens. For example, during the exercise the user may not need to see the settings dialogs and/or the transcript panel 110 and the video playback screen 118 may expand to provide the user with more convenient view of the video playback.

With continued reference to FIG. 11, the transcript panel 110 may remain substantially blank during playback of the audio and/or video streams when the exercise is conducting in these modes. As illustrated however, the transcript panel 110 may be a preferred location to display copyright information or other information regarding the materials presented in the exercise. Accordingly, the content engine 15 may be adapted to dynamically load content into the exercise environment 14, such as from an XML file, to display content background information 138 in a suitable location, such as in the transcript panel or any other suitable location.

Once the user begins the exercise by clicking the play/pause button 126, the user begins transcribing the material presented by the exercise into the input panel 112. As shown in FIG. 11, the user is conducting the exercise in "word-by-word" coaching mode and differences between the input transcript and the actual transcript are indicated to the user by at least one means. For example, the color, the font, and/or the format of the text in the input screen may be modified when there is an error in the dictation. In a preferred mode, the text in the input screen may be changed from black font to red font. For the purposes of the present application and clarity for readers thereof, the text that would be presented in altered color in a live implementation of the present systems is shown in the illustrations as underlined text. Accordingly, in FIG. 11, the first colored word "ase" is flagged for the user because the correct word should be "the". Additionally, in the event that the user had selected the punctuation check option to on, certain text would be flagged for the user for failing to capitalize or correctly punctuate certain word, phrases, or sentences of the text.

When in the check word-by-word mode of the exercise, the user may elect to have sound effects turned on or off, such as by toggling the sound effects button 140. When the sound effects are turned on, a sound may play for the user upon entry of a correct word, an incorrect word, or both. The instant audio feedback may be helpful to a student that is watching the video playback screen 118 rather than the text being added to the input panel 112.

As illustrated in FIG. 11 and in some of the following figures, the exercise environment 14 may be adapted to provide the user with substantially immediate notice of mistakes made during the course of the exercise. The feedback capabilities of the exercise environment are made possible at least in part by the content engine 15 and the analysis module 124 illustrated schematically in FIG. 1 and operating in the background of the exercise environment 14. In one implementation of the analysis module, the content engine waits for the user to enter a space in the input panel. The analysis module then reviews the word (i.e., the string of characters following the immediately preceding space) and compares it to the correct transcript incorporated in the exercise content package. If the inputted word is a mismatch, it is flagged for the user as such (e.g., by changing the color, font, format, etc.) and, when in the check word-by-word mode, checks the words preceding and/or following the input word in the transcript and in the user input to determine if the mismatched word is an added word, a concatenated word, the result of a dropped word, or some other form of wrong word. In some implementations, the type of mismatch is recorded for subsequent coaching purposes. Additionally or alternatively, the type of mismatch may be used to modify the method used to flag the error for the user, such as modifying the color coding or format coding. Similar methodologies may be used in 'check entire exercise mode' to provide rapid feedback to the user upon selection of the "check" button 142.

In other implementations of the analysis module, such as may be preferred when the exercise is conducted in check entire exercise mode and word-by-word mode, the analysis module 124 may utilize probability-based intelligent analysis to maximize the accuracy of the analysis. In a probability-based analysis, the analysis module 124 may be adapted to look forward and backward with the text of the correct transcript and the user's inputted transcript to determine the probability that the unidentified character strings are intended to match up with a particular section of the correct transcript. Once the analysis module has determined to a high probability that it is comparing the right portions of the user's transcript and the correct transcript, the analysis module may proceed to check for errors. In some implementations, the analysis module 124 may be adapted to check for certain forms of errors first, such as an added word or the result of a dropped word before proceeding to check for other types of errors, such as a concatenated word or simply a wrong word or string of nonsensical characters. The use of probability-based analysis may be particularly appropriate in long or complex exercises where the user may intentionally or unintentionally make numerous errors or drop large portions of the material. Rather than flagging the majority of the input text as incorrect when the analysis module is merely comparing the wrong portions, the probability-based analysis may enable more accurate analysis. Additionally, the probability-based analysis may enable faster and/or more accurate identification of the errors and the types of errors.

Figure 12:
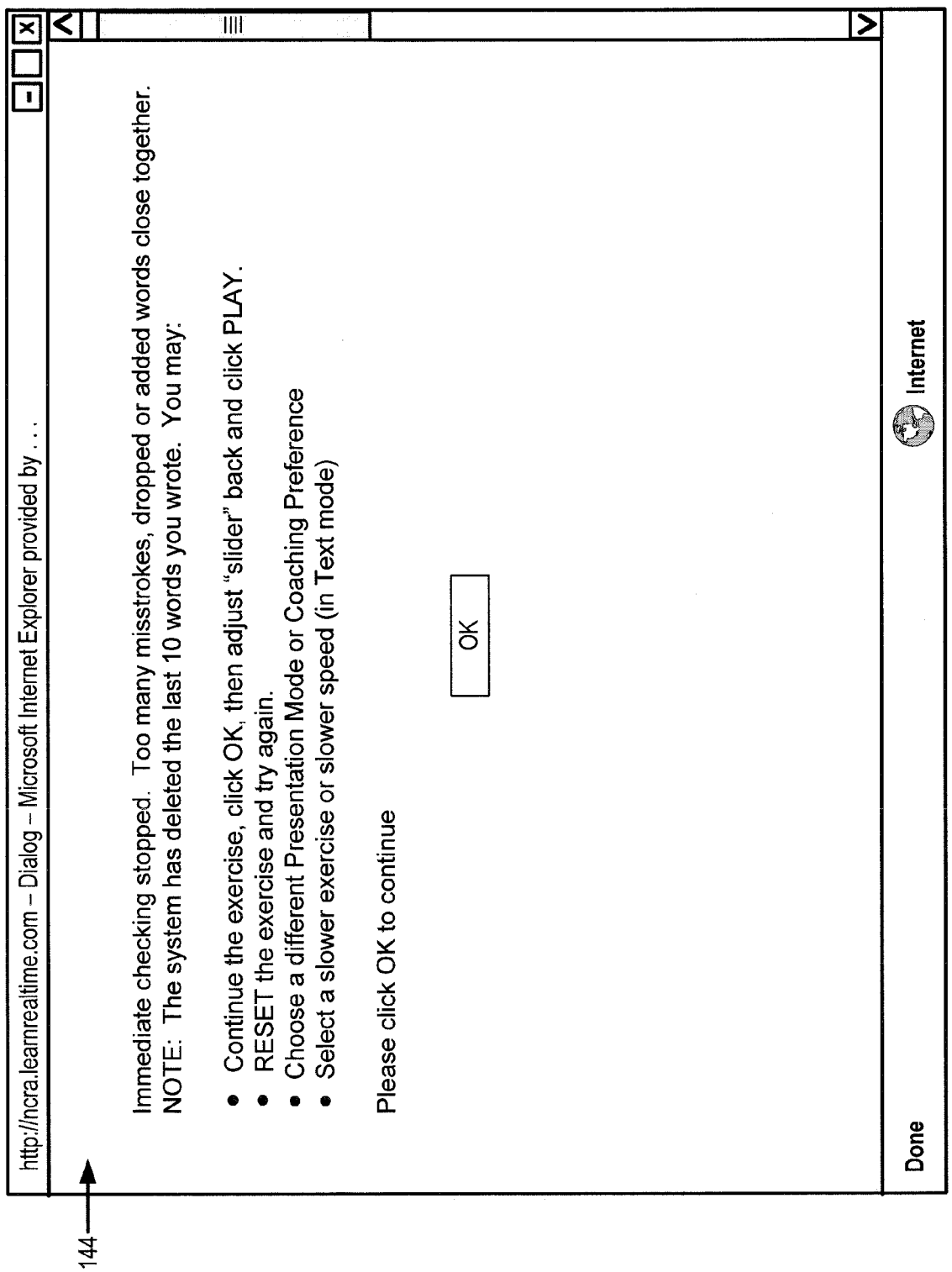
FIG. 12 is a display of an exercise environment having a control dialog pop-up.

Referring now to FIG. 12, which represents a user's failed attempt to practice the exercise selected, one guided coaching tool is illustrated. As seen in FIG. 12, the user was attempting to transcribe the same dialog input in FIG. 11, but made several mistakes including dropping several words in a row. In some implementations of the present learning management systems, the content engine 15 with the assistance of the analysis module 124 may be adapted to pause the exercise when a user has committed more than a predetermined number of errors in the exercise or a predetermined number of errors within a certain number of words. As illustrated, the exercise was interrupted by a pop-up screen indicating that exercise was stopped, why it was stopped, and providing suggestions as to what the use can do to improve performance. Additionally or alternatively, the pop-up interruption screen 144 may provide the user with a stand-alone practice area for the user to practice a difficult combination of words prior to returning to the actual exercise. For example, in some implementations of the present systems, the analysis module 124 and the content engine 15 may pause the playback of the exercise with even a single mistake. The pop-up interruption window 144 may then display the words that were added, dropped, or otherwise incorrect in the input along with adjacent words to illustrate the problem area. The user may then be prompted to practice the combination of words a predetermined number of times in a practice window separate from the input panel prior to returning to the exercise. Such an implementation may provide quick and focused feedback to the user with ample opportunities to correct mistakes and develop better skills.

Figure 13:
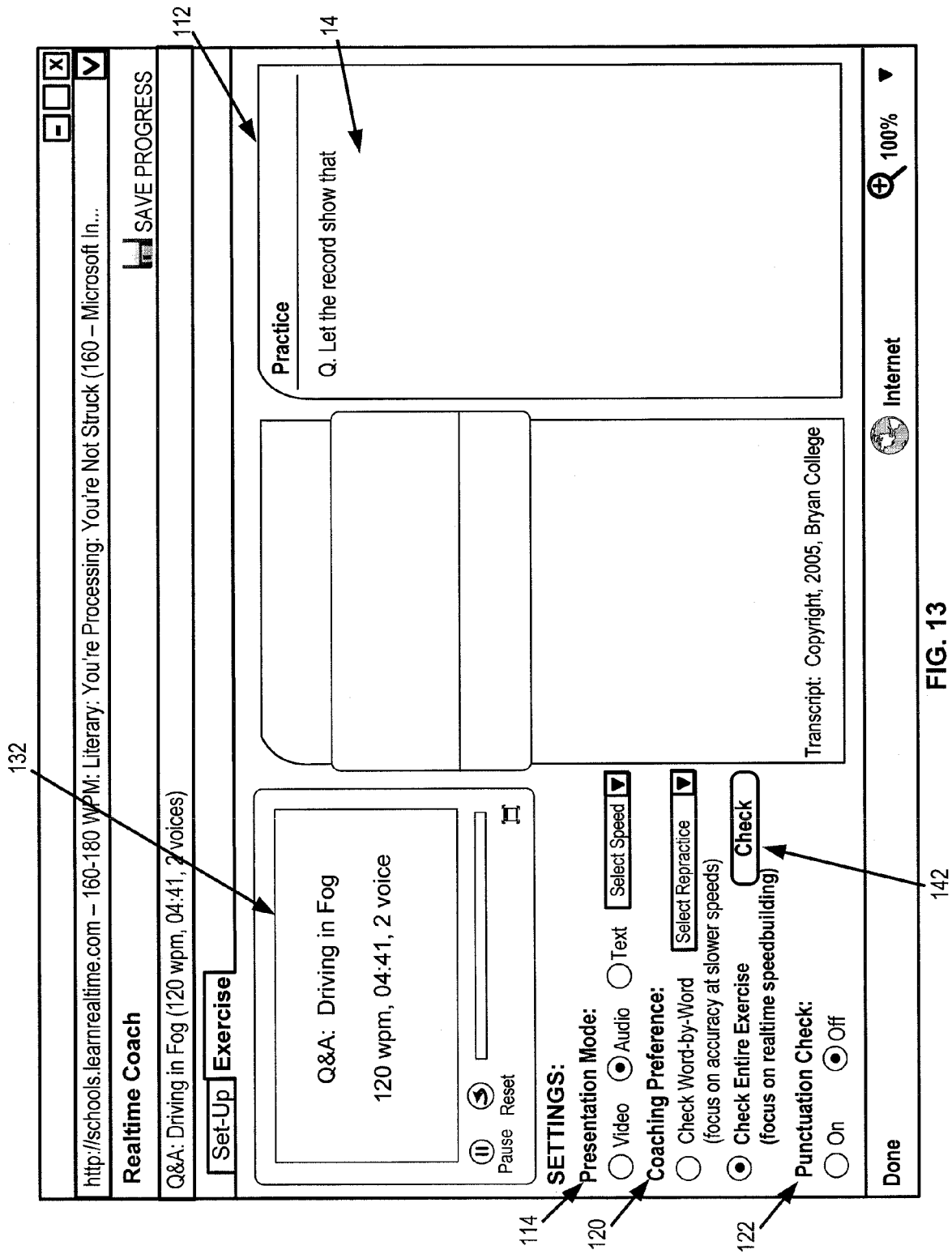
FIG. 13 is another display of an exercise environment.

FIG. 13 illustrates the exercise environment 14 when the user has elected to conduct the exercise in audio only mode (see selection in presentation mode selector 114) and with the coaching preference mode 120 set to 'check entire exercise' with the punctuation check option 122 set to on. In the audio only mode, the streaming media player 132 may be adapted to maintain the intro screen rather than presenting a streaming video. Nevertheless, the slider bar 134 and streaming progress bar 136 may continue to be active in response to the streaming audio that is downloaded to the local cache and streamed to the user. The input panel 112 of FIG. 13 further illustrates that the 'check entire exercise' mode has allowed the user to input text including several errors without flagging them for the user. Accordingly, the check entire exercise mode may allow the user to focus on speed and completing the exercise, the check word-by-word mode may aid the user in improving accuracy while focusing less on the speed of the user.

Figure 14:
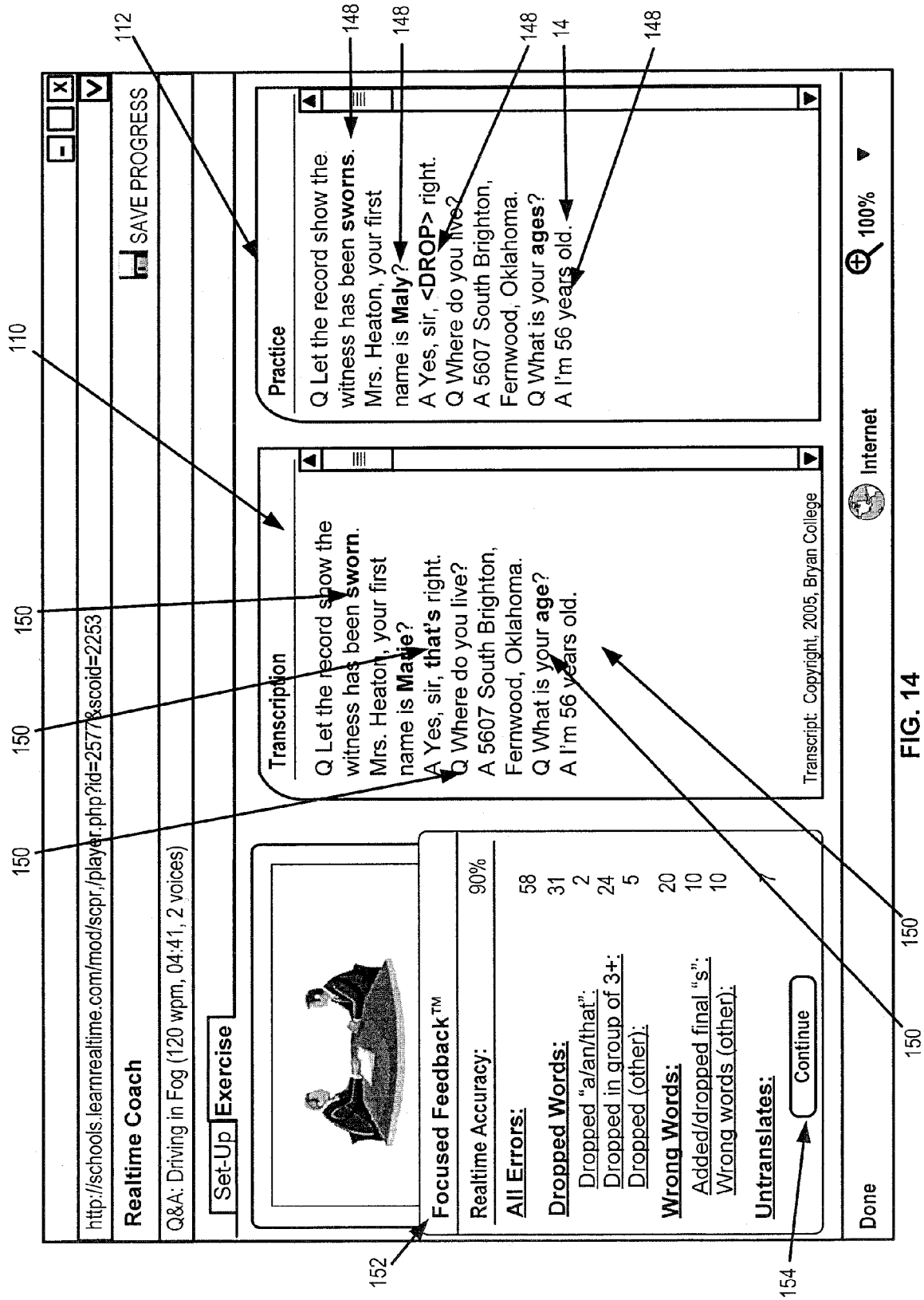
FIG. 14 is another display of an exercise environment.

FIG. 14 illustrates the exercise environment 14 once the user has clicked the check button 142 in FIG. 13. Among the changes to the exercise environment 14, the content engine of the present disclosure is adapted to display the correct transcript 146 that corresponds to the exercise in the transcript panel 110. Additionally, the content engine 15, such as by the analysis module 124, is adapted to compare the correct transcript 146 with the material input by the user into the input panel 112. FIG. 14 illustrates an alternative manner of indicating errors or mismatched words, such as by displaying the mismatched word in bold face type or varied colors. Additionally, FIG. 14 illustrates that the content engine 15 and background analysis module 124 may be adapted to insert the text "<DROP>", "<MISSING>", "<DROPPED>", or any other indicator, such as a text indicator, when there has been a dropped word, as seen in the input panel 112. Additionally, the content engine 15 and the analysis module 124 may be adapted to modify the color, the font, or other aspect of the correct transcript 146 for words corresponding to the errors identified in the input panel 112 to help the user identify the mistakes, FIG. 14 also illustrates the operation of the error check mode in that the text in the input panel 112 is flagged where the user either typed incorrect or omitted words 148. The transcript panel 110 also includes corresponding highlighted, colored, or flagged text identifying the correct words 150. Thus, among other examples of real-time advice, by identifying errors and providing correct words in real-time, the learning system 10 of the present disclosure is capable of providing real-time advice to users.

FIG. 14 also illustrates a coaching summary box 152 showing the number of errors and the accuracy level. Additionally or alternatively, the coaching summary box 152 may include a link for items the user needs to practice during a focused repractice exercise, such as an "items to repractice" or other link described with reference to FIGS. 24 and 25. When the user clicks the "items to repractice" link, the content engine 15 may expand the coaching summary box 152 or may open a new window showing a list of the mismatched words together with a predetermined number of words before and/or after the mismatched word. The content engine 15 may also prompt the user to repractice each of the mismatched words a predetermined number of times and may provide space for such repractice to allow the user to hone skills in certain struggling aspects without repracticing the entire exercise.

Additionally or alternatively, the coaching summary box 152 may display a list of clickable menu items illustrating the number of mismatches caused by "adds only," "drops only," "untranslates only," "misstrokes and conflicts only," and other types of errors. When the user clicks one of these clickable menu items, only errors of the type clicked are presented to the user, which may be presented for the purpose of providing information only and/or for the purpose of allowing the user to repractice those particular types of errors.

The content engine 15 may be adapted to provide adaptive remediation to a user based upon error-related feedback reported back from the analysis module. For example, depending upon the frequency, intensity, recurrence, time and other parameters of an error or set of errors committed by a user, the content engine 15 may obtain and present content tailored and focused on improving the user's performance with respect to the user's error-prone skills. Thus, the content engine 15 is capable of presenting, through the exercise environment, to a user, specific content or exercises likely to be most beneficial in assisting users in improving their performance relating to specific areas of weak or developing skills.

Figure 15:
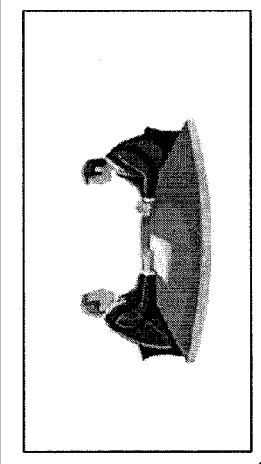
FIG. 15 is another display of an exercise environment.

Still additionally or alternatively, the coaching summary box 152 may include a "continue" link 154 allowing the user to return to the exercise at the point where the user elected to check the exercise, FIG. 15 illustrates the exercise environment 14 after the user has clicked on the "continue" link 154 of FIG. 14. As can be seen by comparing FIGS. 13 and 15, the exercise environment 14 may return to precisely the same screen from which the user elected to check the work and may provide continue instructions in the input panel 112 or elsewhere in the exercise environment. As illustrated, the user may continue from the prior location by simply clicking the play/pause button 126. Additionally or alternatively, the user may continue from a different location by using the slider bar 134.

Figure 16:
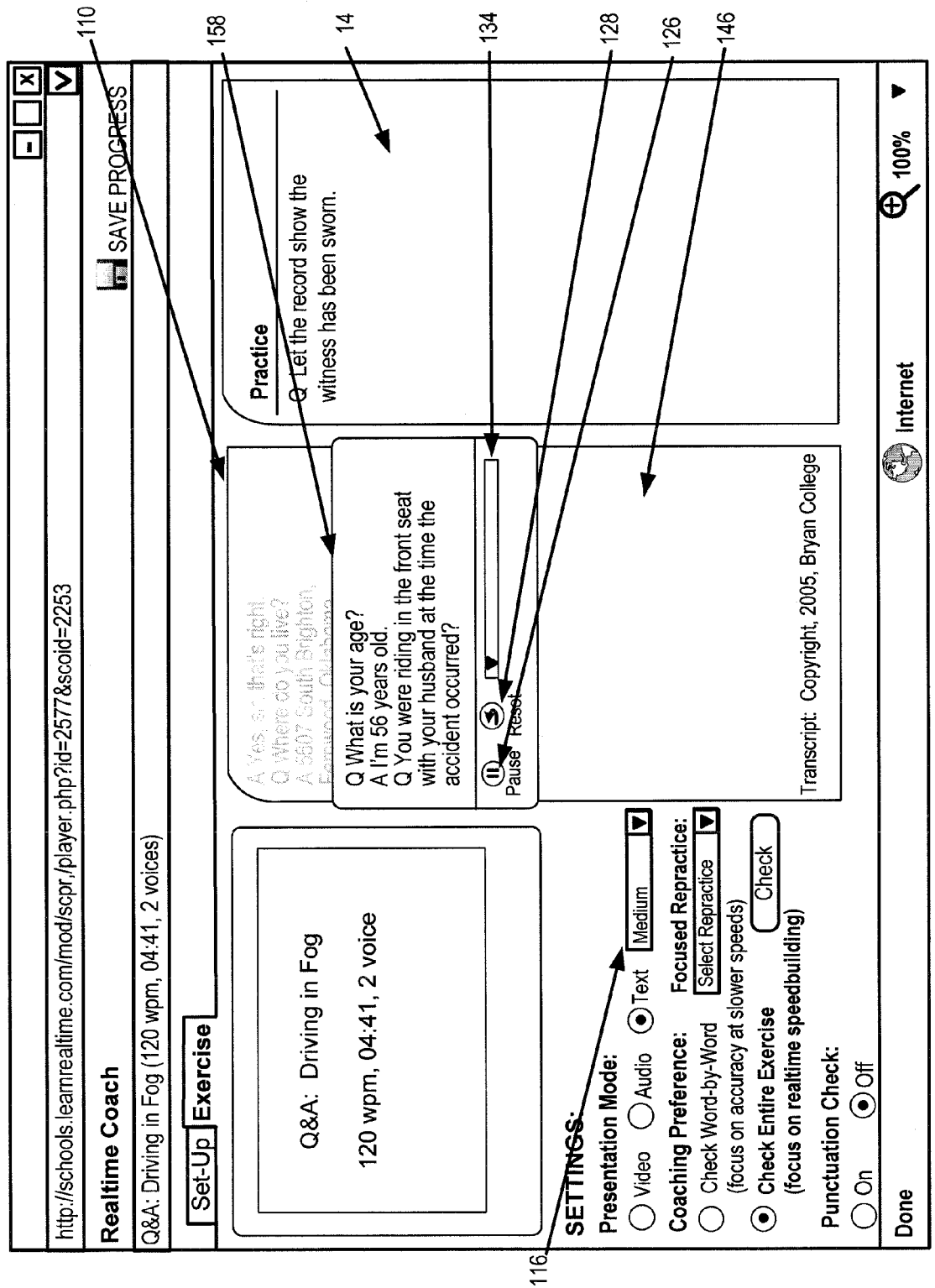
FIG. 16 is another display of an exercise environment.
Figure 17:
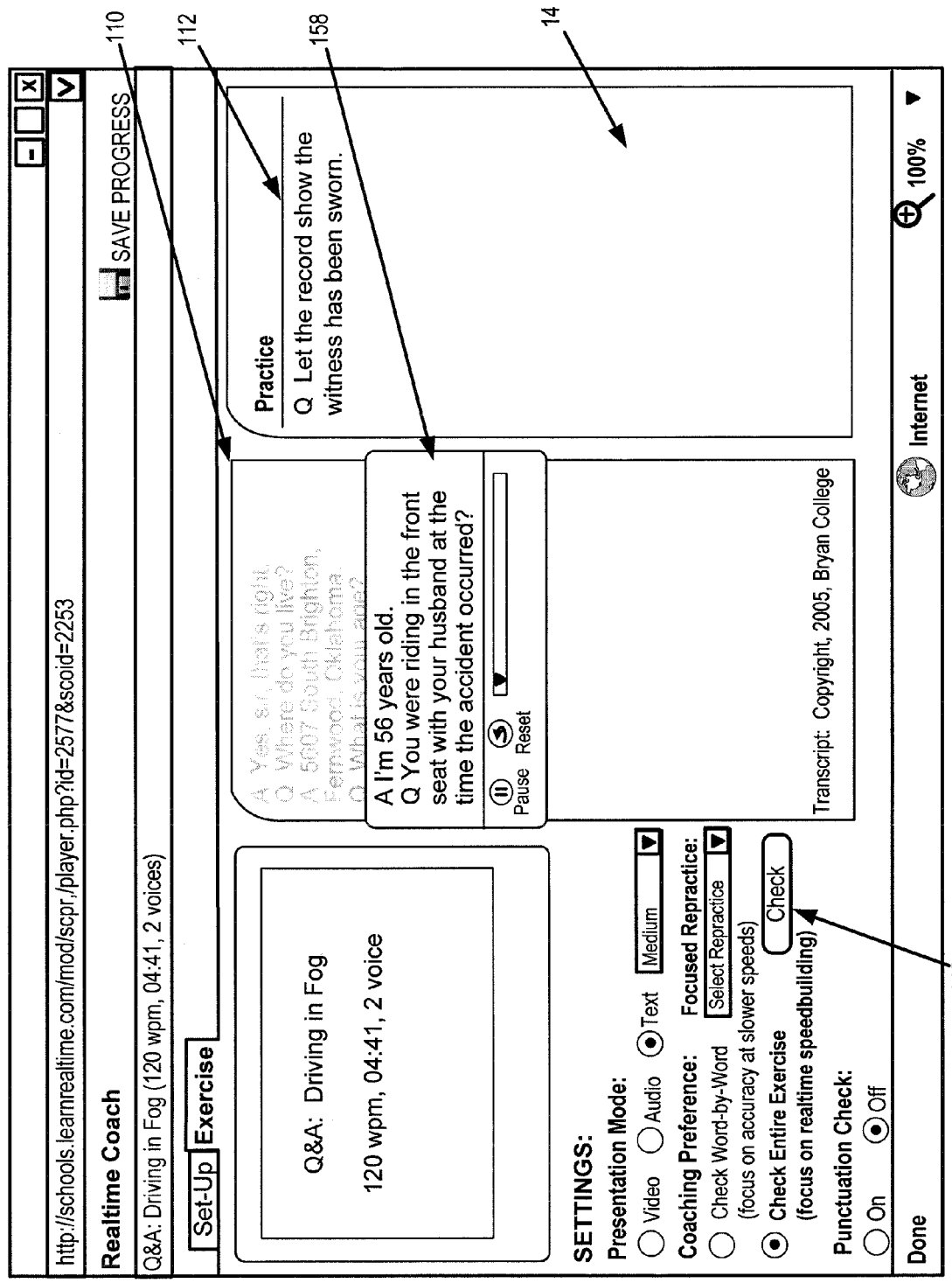
FIG. 17 is another display of an exercise environment.

The text only presentation mode will now be described with reference to FIGS. 16 and 17. As seen in FIG. 16, the user may be able to select the speed 116 of the text to allow the user to practice at different speeds, such as introduced above. In other aspects, the exercise environment 14 may be substantially the same as the exercise environments in other presentation modes. However, in the text only mode, the transcript panel 110 may include a dynamic text player 158 adapted to dynamically load text of the underlying correct transcript 146 from an XML file or other type of file.

In the text only mode, the controls (i.e., play/pause button 126, reset button 128, slider bar 134, and streaming progress bar 136) may be deactivated in the streaming media player and loaded into the dynamic text player 158 to allow the user to control the playback of the text stream. The dynamic text player 158 may "stream" the text to the user through use of a text viewer 160 adapted to clarify and brighten the text of the transcript while it is within the text viewer 160. The text viewer 160 may be adapted to remain in a fixed location while the text is scrolled upward at the pace selected by the user by the speed control 116. As illustrated in FIG. 17, the text in the text viewer 160 may be brightest as it enters the text view and then gradually blur to the top of the viewer 160. The text may be advanced or scrolled upward through any suitable programming means to accomplish the desired rate. In some implementations, the text may scroll one pixel at a time to maximize the smoothness of the streaming. When the user is interacting with the exercise environment in text only mode, the user may be able to select either coaching preference mode and the analysis module 124 and content engine 15 may provide similar feedback and coaching responses as described above.

The exercise environment 14 illustrated in various modes of operation in FIGS. 9-17 may be adapted to facilitate the user's interaction with the exercise environment in several ways, some of which were discussed above. Additionally or alternatively, the input panel 112 may be adapted to work seamlessly with one or more commercially available computer assisted transcription software packages to facilitate the integration of external input devices with the exercise environment. Additionally, the side-by-side layout of the input panel 112 and the transcript panel 110 facilitates the user's comparison and review of errors identified by the content engine 15 and, when in the text only mode, provides a convenient manner for the user to see the streaming text alongside the input panel 112.

Additionally or alternatively, the content engine 15 may be adapted to provide a cursor focus function. The cursor focus function may be adapted to ensure that the input from the user is always into to the input panel 112 rather than at some other location in the exercise environment. Accordingly, when the user uses a curser to click the play button 126 in the settings panel 108, the cursor focus reverts from the settings panel 108 back to the input panel 112. Accordingly, once the user clicks the play button 126 to begin the exercise, the user does not have to remember to position the cursor back into the input panel 112 before beginning to type. Therefore, the user is able to focus on the task of the exercise rather than the computer's behavior.

The foregoing discussion has focused on the exemplary educational context of instructing court reporters and other transcriptionists, such as medical transcriptionists and other coders. However, as indicated previously in the present application, the relationship between the learning management environment, the exercise environment, the user input devices, and the content engine may be adapted to provide real-time or substantially real-time practice of practical skills rather than, or in addition to, recollection, comprehension, or understanding of academic concepts. Additionally, the learning systems of the present disclosure may provide feedback and coaching systems in substantially real-time to allow the user to practice those skills that need improvement. The learning systems may be adapted to cooperate with any variety of external user input devices and thereby be adapted to train professionals, technicians, or others in a variety of occupations or skill sets.

As discussed at various points above, one aspect of the present disclosure includes the relationship and communication between the exercise environment and the learning management environment, or more particularly, between the learning management system 11 and the navigation engine 13 that loads the exercises for the user, such as through the content engine 15, wherein the content is stored in a content repository that is remote from the server or domain on which the learning management system 11 is hosted. Referring to FIG. 1, the content engine 15 may include a reporting module 160 that runs in the background of the exercise environment. The reporting module 160 may be adapted to communicate any variety of information from the exercise environment to the navigation engine 13, which may be adapted to communicate such information to the learning management system 11. In a preferred implementation, the reporting module 160 may be adapted to communicate the time spent by the user in a given exercise and the accuracy attained by the user in the exercise. Accordingly, the reporting module 160 may be in communication with the analysis module 124 to receive the accuracy information from the exercise environment 14. Additionally or alternatively, the content engine 15 may combine the analysis module and the reporting module into a single module. Additionally, the content engine 15 may include a runtime clock or other timer mechanism to record the amount of time the user spends in the exercise. The timer mechanism may be adapted to distinguish between actual practice time and time spent configuring the exercise or other non-practice time while the exercise environment is open, such as when the user leaves the exercise environment open while taking a break from the exercise.

The content engine 15 may be adapted to dynamically update the time and accuracy records while the user is participating in the exercise. The reporting module 160 via the content engine and the navigation engine 13 may additionally or alternatively be adapted to communicate the time and accuracy records back to the learning management system at predetermined times and/or upon predetermined events. For example, the exercise environment 14 and the reporting module 160 may be adapted send updated time and accuracy reports to the learning management system when the user clicks the "check" button 142 or when the user clicks the "save progress" button 162 shown on each of the exercise environments of FIGS. 9-17. Additionally or alternatively, the content engine 15 by way of the navigation engine 13 may send updated records to the learning management environment when the user closes the exercise environment browser window.

Depending on the configuration of the reporting module and the frequency with which it sends updated records to the learning management environment, the servers hosting the learning management environment may be unduly burdened and the user's experience negatively affected, such as by distractions caused by frequent screen refreshes, if the entire learning management environment is updated every few minutes. Accordingly, the learning management environment may be adapted to control the refresh rate of the information presented to the user. For example, the learning system of the present disclosure may be adapted to know when the learning management environment window has the focus of the user's computer (as compared to being displayed in the background while the user interacts with the exercise environment). In such implementations, the learning management system may update the records in the associated databases with the desired frequency of the reporting module but only update the entire learning management environment upon receiving the user's focus. Additionally or alternatively, the learning management system may use Ajax functionality to update or refresh only line items of the learning management environment when the records are updated. Accordingly, when the learning management environment displays multiple exercises that may be selected along with the corresponding accuracy and time indicators, the accuracy and time indicators of only one exercise will be updated as the user is interacting in the exercise environment. The line-item update may significantly reduce the bandwidth requirements, refresh rates, and the load on the servers.

In addition to providing an access port to the exercises, the learning management environment 12 may provide various reporting options and administrative options, as suggested by FIG. 1 and the discussion of FIGS. 1-5. Some of these reports and administrative options will now be described in more detail. With reference to FIGS. 4 and 5 as an exemplary learning management environment 12, the learning management environment may include a calendar module 24. The calendar module 24 may provide a simple calendar interface for the users to schedule classes, meetings, and the like. Additionally or alternatively, the calendar module 24 may provide a customizable and personalized calendar for use by the student, teacher, and administrative users. For example, the students may add personal items to the calendar and mark them as private or public. The users may then be able to select the level of detail desired in the calendar module. Additionally or alternatively, the calendar module 24 may be adapted to provide a discussion forum whereby the user can associate discussion topics with a particular date, either to schedule a group discussion on that date or to provide a method tracking comments to the discussion topic.

The calendar module 24 may include a batch import option whereby the user adds items to the calendar in a simple spreadsheet layout, which may be in any suitable format such as comma separated values or one of the more complex formats. The user may add single items directly to a calendar interface or may open a spreadsheet-type entry screen when the user desires to enter multiple calendar items. Additionally or alternatively, the batch import option may allow the user to import a file containing calendar items from the user's computer. For example, the user's calendar items may be stored in comma separated values file on the user's computer (such as after an export from a personal information manager or from a spreadsheet program) and the comma separated values file may be uploaded and imported into the calendar module 24. The batch import option may require that the user's file of calendar items be in a predetermined format and layout or may be adapted to convert exported files from conventional personal information managers.

Additionally, as discussed above, the learning management environment 12 may include modules adapted exclusively for the administrators of the learning system. One such module may include a SCO batch import module. An SCO is a Shareable Content Object that is SCORM conformant, SCOs that may be associated with the learning management system include the content packages that are presented to the user via the exercise environment. In some implementations, the content packages are hosted on Web domains or servers that are remote from the learning management system 11, as discussed above. However, the learning management system needs to have access to the content manifest files to know what exercises and educational materials are in the particular content packages, or SCOs. Accordingly, when an administrator wants to add multiple new content packages to a learning management system, the administrator may utilize the SCO batch import module to set up multiple SCOs without requiring manual set up of each SCO. In one implementation, the administrator would select one or more SCOs from a list, such as from a list of files in a particular folder or server, and click submit to batch import the selected SCOs. The batch import module may prompt the administrator for one or more details regarding the imported SCOs to properly associate the SCOs with the other materials in the learning management system but may be adapted to perform the actual set up through the simple interview process rather than requiring technical sophistication on the part of the administrator.

Referring again to FIG. 5, the learning management environment 12 may provide user reports in a personal reports module 26. One exemplary personal report is the My Practice Time report 170 shown in FIG. 18. As illustrated, the My Practice Time report 170 displays the user's actual practice times in a calendar layout. Additionally or alternatively, the My Practice Time report 170 may provide links on each day that the user can click to pull up details about the exercises practiced and the performance in each exercise on the selected day(s), such as shown in FIG. 20.

Another exemplary personal report is the My Progress report 172 shown in FIG. 19. As illustrated in FIG. 19, the My Progress report 172 may pull information from the learning management engine and associated databases to present a report of the exercises practiced by the user, the time spent, and the accuracy percentage attained on each of the exercises. In some implementations, the user may be able to sort the report by one or more of the columns. Additionally or alternatively, some implementations may incorporate a date function into the progress report to allow the user to sort by date or to see improved accuracy over time. Any amount or type of data may be reported to a personal or administrative user of the learning system 10 for one or more users of the system 10. For example, the report 172 may additionally or alternatively display and/or sort data based on a single exercise segment, a single exercise, selected multiple exercises, or all exercises relating to practice total practice time logged, total accumulated time spent practicing and/or reading, accuracy percentage, high scores, low scores, most common errors, and/or rate of improvement. Such data may be displayed in any report format, including table, calendar, chronological, chart, graph, or any other type of static or interactive display. For example, a line or other graph may illustrate one or more user's typing speed improvements with correlating practice times over a period of time in order to tell a user or administrator how typing speed improves both over time and as a function of total practice time by the one or more users. An administrator of an exercise environment may provide incentives for certain performance by users, including real or virtual awards, trophies, or other incentives that may be posted to a user account incentives module or may be delivered directly to the user.

Figure 18:
FIG. 18 is a display of a practice time report screen.

FIG. 20 illustrates a Practice Log 174 similar to the My Practice Time report 170 of FIG. 18. The Practice Log 174 may be available to the user and/or to an administrator or educator that needs to monitor a student's practice. As seen in FIG. 20, the Practice Log 174 includes a calendar layout showing the user's practice time each day and including a details link 176 to pull up the details of a particular day or week. When the user clicks the details link 176, the learning management system may display exercises, times, and accuracies for the given day or period of days, in the same screen or in a new window.

FIG. 21 illustrates that an administrator or educator may be allowed to produce progress reports on more than one student at a time. For example, a selected students progress report 178 may be displayed by asking the user to selected the desired students from a list, which may include designations of groups of students such as those in a given class at a college, and then generating the requested progress reports in a single screen layout. Similarly, the administrators or educators may be able to generate selected students practice logs similar to the Practice Log 174 of FIG. 20 by selecting multiple students from a list. When the practice log shows data from multiple users, the details portion of the report may include a column indicating which users practiced which exercises and/or may sort the details by user.

In some implementations, an administrator or educator may want to know simply how much time is being spent by the students in the learning system, such as to evaluate budgets and benefits to the students. In such circumstances, the learning management system may be adapted to provide a practice time for all students report, which may be in calendar layout or columnar layout, that summarizes the time spent by all of the students associated with a particular instance of the learning system, such as all of the students registered to use the learning system at a particular educational institution. One example of such an all students report is shown in FIG. 22 as the practice time total for all students report 180. While the illustrated all students report 180 does not display a details link, such a feature may be incorporated into the all students report in a manner similar to the implementation in the select students report. Additionally or alternatively, the administrators may want to know about the status of users, such as whether they are enrolled or registered users of the learning management system. In such circumstances, the admin reports module 28 may include a link for an enrolled users report.

Figure 23:
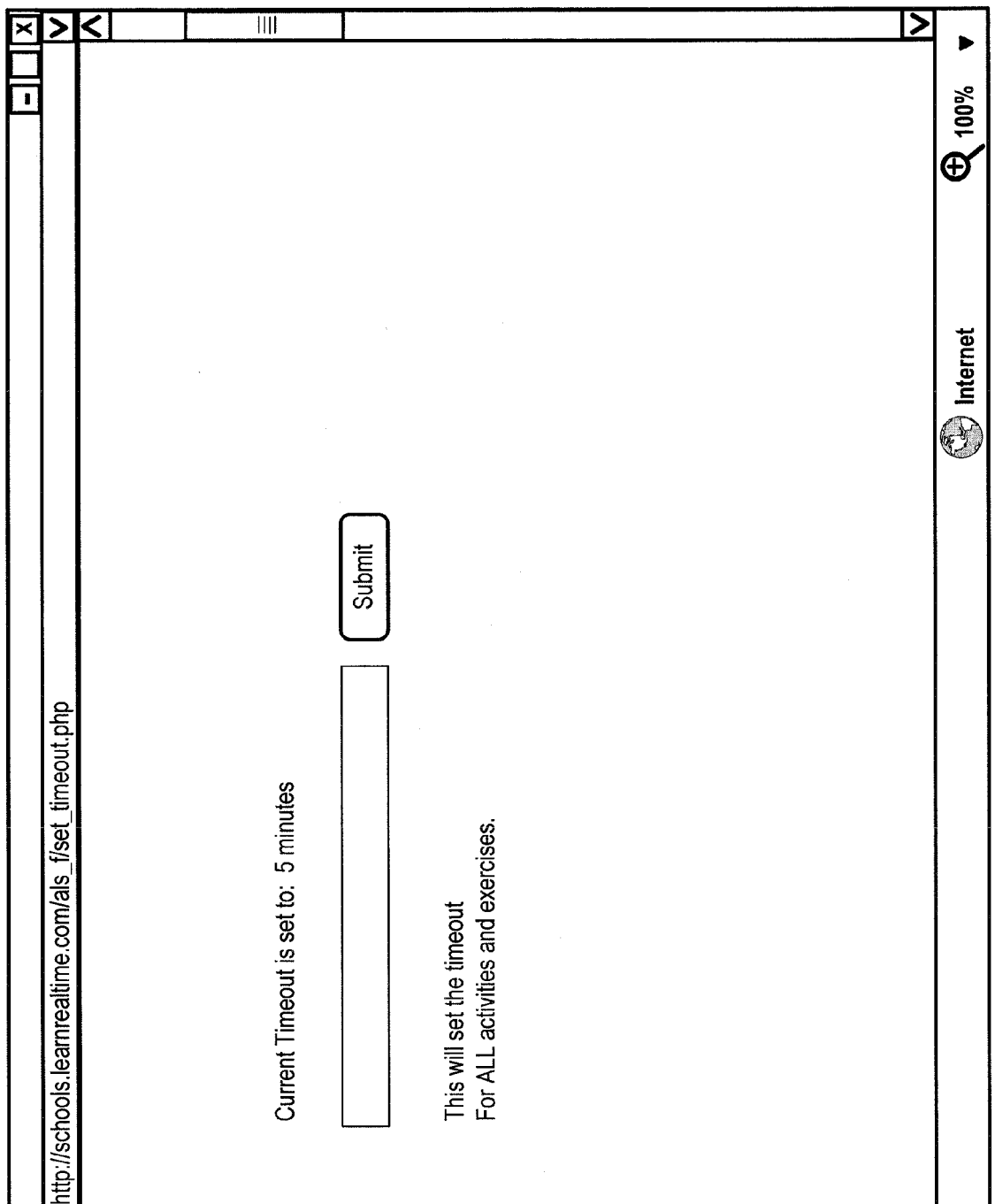
FIG. 23 is a display of a timeout setting screen.

Referring back to FIG. 5, the admin reports module 28 is shown including a set timeout option 182. Upon clicking the set timeout option link, the learning management system may present the user with a timeout dialog screen 184, such as shown in FIG. 23. The timeout dialog screen 184 may be used by administrators and/or educators to set the timeout limit for entire institutions, classes, groups of students, individuals, exercises, or groups of exercises. The timeout limit is the time that the user is allowed to sit idle before the exercise environment recognizes that the user is not actively practicing. Once the timeout limit is reached, such as if the user leaves for lunch or other break, the learning system, and more particularly the content engine 15, stops counting additional time as practice time. The timeout limit, therefore, is one method of attempting to ensure that the practice time recorded by the learning system is an accurate record of actual practice rather than merely an open exercise environment window. In some implementations, the administrators and/or educators may wish to vary the timeout time limit from time to time so that users are not able to strategically interact with the system to maximize recorded practice time while minimizing actual practice times. Additionally or alternatively, the learning system may be adapted to allow the administrator or educator to select random or automatic control of the timeout function such that the learning system varies the timeout limit over time without requiring the administrators frequent input. Other reports and administrative options may be incorporated into the learning system as necessary or appropriate for the institutions and/or the context of the educational materials.

Figure 24:
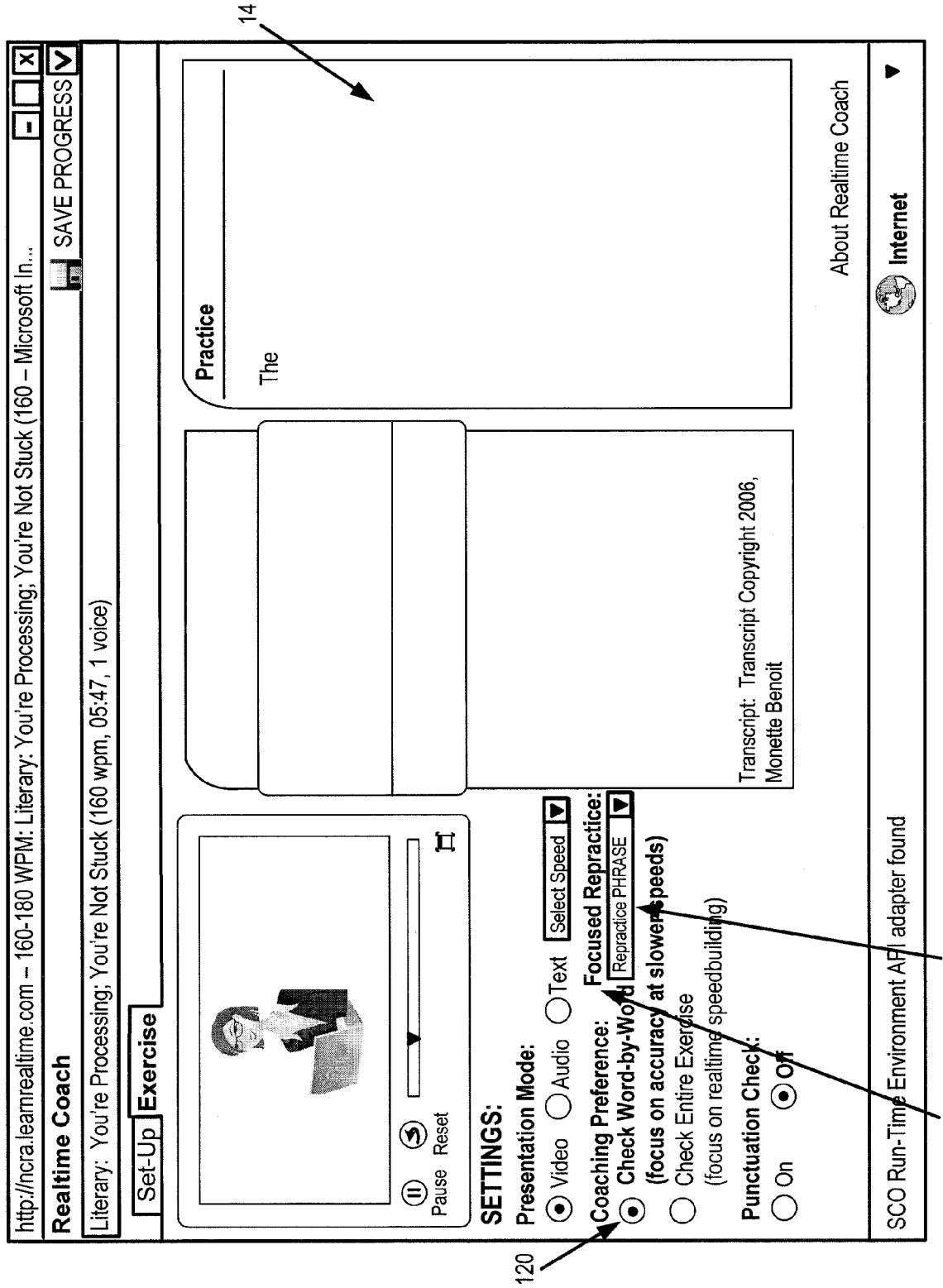
FIG. 24 is a another display of an exercise environment.
Figure 25:
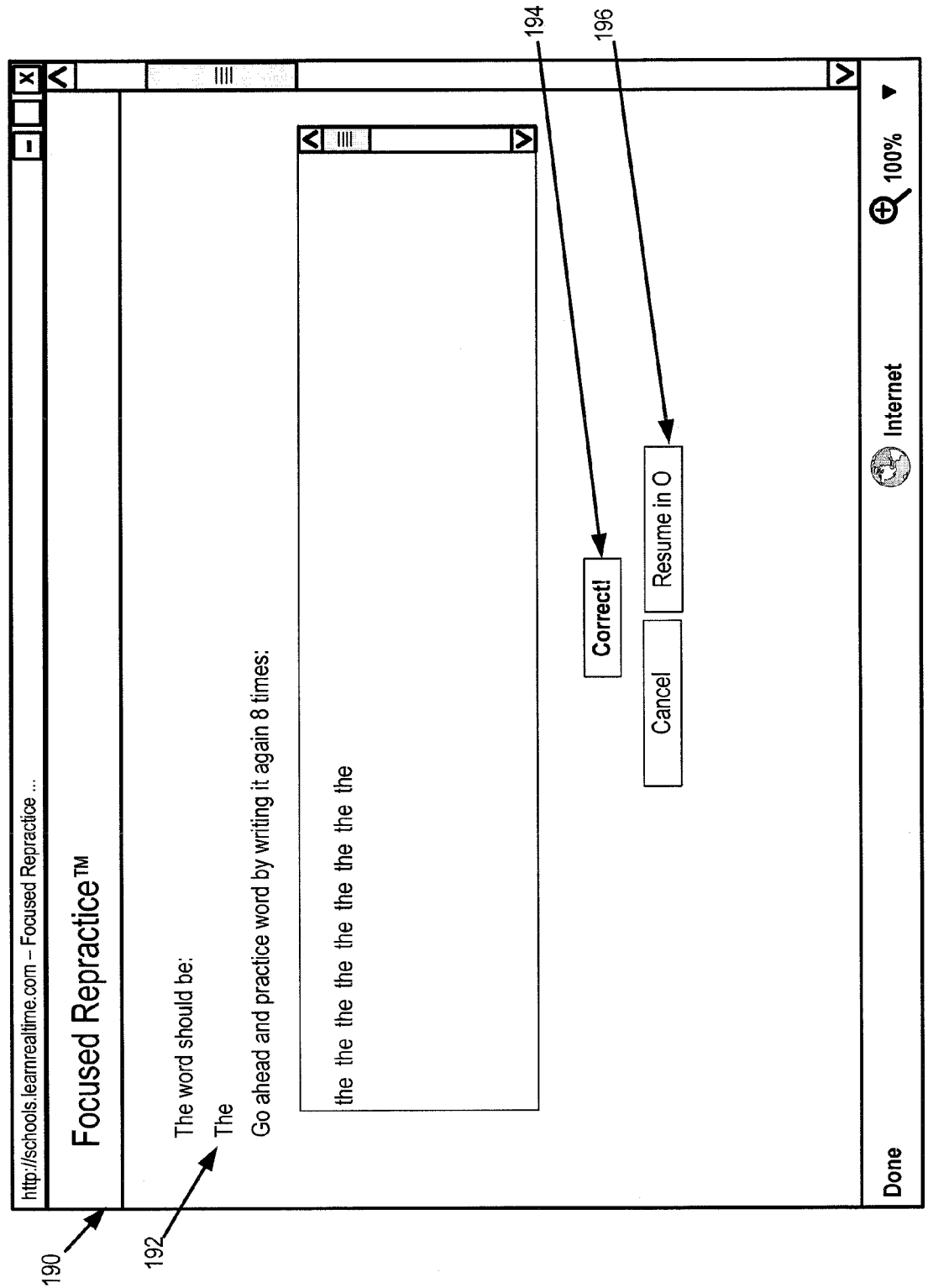
FIG. 25 is a display of a focused repractice screen.

FIG. 24 illustrates the exercise environment 14 where a user may select certain options 186 relating to focused repractice 188 within the coaching preferences mode 120. The options 186 may, for example, include repractice by word, repractice by phrase, or no repractice. Focused repractice 188 functions to immediately pause an exercise for a user upon identification of an error and then provide a pop-up or screen requiring repractice of a word, phrase, or other content relating to the error. For example, when focused repractice by word is selected by a user, if the user incorrectly types the word "the" when the correct word "the" is expected, a focused repractice pop-up 190, see FIG. 25, appears, indicating the proper word or phrase 192 and then requiring the user to correctly type the word "the" eight or more times. Upon correctly typing the word "the" a given amount of times, a "Correct!" message 194 appears congratulating the user for successful repractice on the focused correct word or phase 192. The user may then click a button 196 to resume practice in the exercise environment 14 (FIG. 24). For repractice of phrases, focused repractice may require a user to correctly repractice, for a certain number of repetitions, a certain number of words before and/or after, for example three words before and after, a word containing an error before the user can return to the exercise.

As discussed above, the present disclosure provides a method of practicing skills and reporting and tracking performance on skills-based materials rather than on quizzes and tests that are only able to evaluate recollection, comprehension, or understanding of academic concepts. The content engine's adaptation to dynamically load streaming practice materials and to compare a predetermined transcript with a user's input in substantially real-time and to convert that comparison to a percentage accuracy provides a method for educators to monitor the learners' progress and to thereby provide more directed assistance to the learner when the educator and the learner are actually together or communicating directly.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. The principles of the present disclosure may be embodied in other specific forms without departing from its structures, methods, or other essential characteristics as broadly described herein. The described embodiments are to be considered in all respects only as illustrative, and not restrictive. The scope of the disclosure is, therefore, not limited by the foregoing description and all changes that come within the meaning and range of equivalency of the foregoing description are to be embraced within its scope. Similarly, where the description recites "a" or "a first" element or the equivalent thereof, such description should be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A network-based learning system, comprising:
   an input module configured to receive psychomotor input, wherein the psychomotor input comprises English words translated by a software application, wherein the software application is configured to convert machine steno into English; and
   an analysis module configured to compare the received psychomotor input with ideal psychomotor input.

2. The network-based learning system of claim 1, wherein the analysis module compares received psychomotor input on a word-by-word basis as a user is generating the psychomotor input.

3. The network-based learning system of claim 1, wherein the analysis module compares received psychomotor input after a user has finished generating the psychomotor input.

4. The network-based learning system of claim 1, wherein the analysis module is adapted to present focused repractice to a user, wherein the focused repractice comprises repractice of specific errors by at least one of a word, a phrase, and an error type.

5. The network-based learning system of claim 1, wherein the analysis module displays differences between the psychomotor input and the ideal psychomotor input through at least one of highlighted text, bolded text, strikethrough text, text of differing colors, text of differing sizes, and italicized text.

6. The network-based learning system of claim 1, wherein the analysis module displays a summary to a user comprising kinds of errors, wherein the kinds of errors further comprises at least one of drops, untranslates, and wrong words.

7. The network-based learning system of claim 6, wherein the term "drops" comprises omitted words.

8. The network-based learning system of claim 6, wherein the term "untranslates" comprises words that the software application did not translate into English text.

9. The network-based learning system of claim 6, wherein the phrase "wrong words" comprises words from a user's psychomotor input that do not match words from the ideal psychomotor input.

10. The network-based learning system of claim 1, wherein the analysis module displays a summary to a user that includes a rate of an occurrence of errors.

11. The network-based learning system of claim 1, wherein a communication module communicates the psychomotor input to a data module as psychomotor performance data, wherein the psychomotor performance data includes at least one of errors, kinds of errors, rates of occurrence of errors, percent accuracy, and time spent, and
   wherein the data module is configured to store the psychomotor performance data.

12. The network-based learning system of claim 1, further comprising a reporting module configured to display the psychomotor performance data, through at least one of a fable, a bar graph, a line graph, a pie chart, a calendar, a Stacked bar graph, and as scatterplot diagram.

13. A network-based learning system, comprising:
   an input module configured to receive psychomotor input, wherein the psychomotor input comprises English words translated by a software application, wherein the software application is configured to convert machine steno input into English text; and
   an analysis module configured to compare the received psychomotor input with ideal psychomotor input, wherein the analysis module is configured to display differences between the psychomotor input and the ideal psychomotor input, wherein the differences are displayed via at least one of highlighted text, bolded text, strikethrough text, text of differing colors, text of differing sizes, and italicized text.

14. The network-based learning system of claim 13, wherein the analysis module is configured to compare the received psychomotor input on a word-byword basis as a user is generating the psychomotor input.

15. The network-based learning system of claim 13, wherein the analysis module compares the received psychomotor input after a user has finished generating the psychomotor input.

16. The network-based learning system of claim 13, wherein the analysis module is adapted to present focused repractice to a user, wherein the focused repractice comprises repractice of specific errors by at least one of a word, a phrase, and an error type.

17. The network-based learning system of claim 13, wherein the analysis module displays differences between the psychomotor input and the ideal psychomotor input through at least one of highlighted text, bolded text, strikethrough text, text of differing colors, text of differing sizes, and italicized text.

18. The network-based learning system of claim 13, wherein the analysis module displays a summary to a user that comprises kinds of errors, wherein the kinds of errors further comprises at least one of drops, untranslates, and wrong words.

19. A network-based learning system, comprising:
an input module configured to receive psychomotor input, wherein the psychomotor input comprises English words translated by a software application wherein the software application is configured to convert machine steno into English;
an analysis module configured to compare the received psychomotor input with ideal psychomotor input, wherein the analysis module is configures to display differences between the psychomotor input and the ideal psychomotor input through at least one of highlighted text, bolded text, strikethrough text, text of differing colors, text of differing sizes, and italicized text, and
wherein the analysis module displays a summary to the user that includes kinds of errors, wherein the kinds of errors comprise at least one of omitted words, words that the software application did not translate into English, and words from the user's psychomotor input that do not match words from the ideal psychomotor input.

* * * * *